(12) United States Patent
Shang et al.

(10) Patent No.: US 11,244,234 B2
(45) Date of Patent: Feb. 8, 2022

(54) HUMAN-COMPUTER DIALOGUE METHOD AND APPARATUS

(71) Applicant: Huawei Technologies Co., Ltd., Shenzhen (CN)

(72) Inventors: Lifeng Shang, Hong Kong (CN); Zhengdong Lu, Shenzhen (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 16/514,683

(22) Filed: Jul. 17, 2019

(65) Prior Publication Data

US 2019/0341021 A1 Nov. 7, 2019

Related U.S. Application Data

(63) Continuation of application No. PCT/CN2018/072630, filed on Jan. 15, 2018.

(30) Foreign Application Priority Data

Jan. 17, 2017 (CN) .......................... 201710030361.4

(51) Int. Cl.
*G06N 5/04* (2006.01)
*G06F 16/332* (2019.01)
(Continued)

(52) U.S. Cl.
CPC ......... *G06N 5/043* (2013.01); *G06F 16/3329* (2019.01); *G06F 16/3344* (2019.01);
(Continued)

(58) Field of Classification Search
CPC . G06N 5/043; G06F 16/3329; G06F 16/3344; G06F 16/90332; G06F 40/30;
(Continued)

(56) References Cited

U.S. PATENT DOCUMENTS 6,253,169 B1 * 6/2001 Apte .................... G06F 16/355
704/9
7,092,888 B1 * 8/2006 McCarthy ............ G10L 15/063
379/88.01
(Continued)

FOREIGN PATENT DOCUMENTS

CN 101071418 A 11/2007
CN 102073704 A 5/2011
(Continued)

OTHER PUBLICATIONS

Mizianty, M. J., "Computational support systems for prediction and characterization of protein crystallization outcomes", 2013, Available from ProQuest Dissertations and Theses Professional. (Year: 2013).*
(Continued)

*Primary Examiner* — Eric Yen
(74) *Attorney, Agent, or Firm* — Conley Rose, P.C.

(57) ABSTRACT

An apparatus is pre-equipped with a plurality of dialogue robots, and each dialogue robot is configured to conduct a human-computer dialogue based on at least one topic. The method includes: obtaining a text entered by a user; determining at least one topic related to the text, and determining a target dialogue robot from the plurality of dialogue robots based on the at least one topic related to the text and a predefined mapping relationship between a dialogue robot and a topic, where a target topic corresponding to the target dialogue robot is some or all of the at least one topic related to the text; and allocating the text to the target dialogue robot and obtaining a reply for the text from the target dialogue robot, where the reply is generated by the target dialogue robot based on at least one semantic understanding of the text.

20 Claims, 7 Drawing Sheets

(51) Int. Cl.
  *G10L 13/08* (2013.01)
  *G10L 15/22* (2006.01)
  *G06F 40/35* (2020.01)
  *G06F 16/33* (2019.01)
  *H04L 12/58* (2006.01)

(52) U.S. Cl.
  CPC .............. *G06F 40/35* (2020.01); *G10L 13/08* (2013.01); *G10L 15/22* (2013.01); *H04L 51/02* (2013.01); *G10L 2015/225* (2013.01); *G10L 2015/228* (2013.01)

(58) Field of Classification Search
  CPC ..... G06F 40/35; G10L 13/08; G10L 15/1815; G10L 15/183; G10L 15/22; G10L 2015/225; G10L 2015/228; G10L 15/1822; H04L 51/02
  See application file for complete search history.

(56) References Cited

U.S. PATENT DOCUMENTS

| | | | | |
|---|---|---|---|---|
| 8,977,620 | B1* | 3/2015 | Buryak | G06F 16/35 707/737 |
| 9,754,221 | B1* | 9/2017 | Nagaraja | G06N 3/08 |
| 10,339,926 | B2* | 7/2019 | Gupta | G10L 15/22 |
| 2004/0044516 | A1* | 3/2004 | Kennewick | G10L 15/22 704/5 |
| 2004/0254782 | A1* | 12/2004 | Li | G06F 40/30 704/8 |
| 2005/0033582 | A1* | 2/2005 | Gadd | G06Q 30/02 704/277 |
| 2006/0143216 | A1 | 6/2006 | Gupta et al. | |
| 2008/0091406 | A1* | 4/2008 | Baldwin | G10L 25/51 704/4 |
| 2008/0114710 | A1* | 5/2008 | Pucher | G06N 20/00 706/20 |
| 2011/0103273 | A1* | 5/2011 | Dutta | H04B 7/0877 370/281 |
| 2013/0013290 | A1 | 1/2013 | Funakoshi et al. | |
| 2014/0222436 | A1* | 8/2014 | Binder | G10L 17/24 704/275 |
| 2014/0363075 | A1* | 12/2014 | Li | G06F 16/5838 382/159 |
| 2015/0006555 | A1* | 1/2015 | Fang | G06F 40/30 707/755 |
| 2016/0132491 | A1* | 5/2016 | Watanabe | G06F 40/44 704/4 |
| 2016/0379106 | A1 | 12/2016 | Qi et al. | |
| 2017/0113353 | A1* | 4/2017 | Monceaux | G10L 15/26 |
| 2017/0288942 | A1* | 10/2017 | Plumb | G06N 3/006 |
| 2017/0295121 | A1* | 10/2017 | Zhang | H04L 51/02 |
| 2017/0324867 | A1* | 11/2017 | Tamblyn | H04L 51/24 |
| 2018/0046614 | A1* | 2/2018 | Ushio | G06N 3/0454 |
| 2018/0204111 | A1* | 7/2018 | Zadeh | G06N 3/0436 |
| 2018/0336184 | A1* | 11/2018 | Bellegarda | G06F 40/30 |
| 2019/0163692 | A1* | 5/2019 | Duan | G06F 16/3329 |

FOREIGN PATENT DOCUMENTS

| | | |
|---|---|---|
| CN | 105094315 A | 11/2015 |
| CN | 105931638 A | 9/2016 |
| CN | 106294854 A | 1/2017 |

OTHER PUBLICATIONS

Atoofian, E. (2008), "Energy and performance improvement relying on trivial instructions and speculative snooping in high-performance processors", 2008, Available from ProQuest Dissertations and Theses Professional. (Year: 2008).*

Machine Translation and Abstract of Chinese Publication No. CN101071418, Nov. 14, 2007, 20 pages.

Machine Translation and Abstract of Chinese Publication No. CN106294854, Jan. 4, 2017, 15 pages.

Foreign Communication From a Counterpart Application, Chinese Application No. 201710030361.4, Chinese Office Action dated Dec. 23, 2019, 4 pages.

Foreign Communication From a Counterpart Application, Chinese Application No. 201710030361.4, Chinese Search Report dated Dec. 13, 2019, 2 pages.

Machine Translation and Abstract of Chinese Publication No. CN102073704, May 25, 2011, 20 pages.

Machine Translation and Abstract of Chinese Publication No. CN105931638, Sep. 7, 2016, 16 pages.

Shang, L., et al. "Neural Responding Machine for Short-Text Conversation," Proceedings of the 53rd Annual Meeting of the Association for Computational Linguistics and the 7th International Joint Conference on Natural Language Processing, Jul. 26-31, 2015, pp. 1577-1586.

Foreign Communication From a Counterpart Application, PCT Application No. PCT/CN2018/072630, English Translation of International Search Report dated Apr. 18, 2018, 2 pages.

Foreign Communication From a Counterpart Application, PCT Application No. PCT/CN2018/072630, English Translation of Written Opinion dated Apr. 18, 2018, 4 pages.

* cited by examiner

HUMAN-COMPUTER DIALOGUE METHOD AND APPARATUS

CROSS-REFERENCE TO RELATED APPLICATIONS

This application is a continuation of International Application No. PCT/CN2018/072630, filed on Jan. 15, 2018, which claims priority to Chinese Patent Application No. 201710030361.4, filed on Jan. 17, 2017, both of which are hereby incorporated by reference in their entireties.

TECHNICAL FIELD

This application relates to the computer field, and more specifically, to a human-computer dialogue method and apparatus.

BACKGROUND

With rapid development of the mobile Internet and intelligent terminals, human-computer dialogue is applied more widely. Currently, a widely applied dialogue robot is mainly a retrieval-type dialogue robot. The dialogue robot relies on construction of a very large dialogue database and an intelligent matching technology. This requires that the dialogue database be large enough and user problems be matched as much as possible. Otherwise, "an irrelevant reply" may appear because no proper reply content can be found. However, a current dialogue set is usually a very small and sparse set. The problem of "an irrelevant reply" cannot be resolved regardless of a degree of intelligence of a defined matching model.

Currently, it is known that a generative dialogue robot can understand a user's question through deep learning, and then generate a reply word by word based on the question. A basic idea thereof is generating a reply on the basis of understanding like humans. However, a question entered by a user is usually related to a plurality of topics. For example, in a sentence "Peter declares a divorce by microblogging and competes for custody of two children", the first half of the sentence is more concerned with an entertainment topic, and the second half of the sentence is more concerned with a law topic. Therefore, how to adaptively generate an accurate reply based on dialogue content on the basis of understanding of a natural language becomes a technical problem to be urgently resolved.

SUMMARY

This application provides a human-computer dialogue method and apparatus, to adaptively generate, for different topics, an accurate reply based on dialogue content.

According to a first aspect, a human-computer dialogue method is provided. The method is applied to a human-computer dialogue apparatus, where the apparatus is pre-equipped with a plurality of dialogue robots, each dialogue robot is configured to conduct a human-computer dialogue based on at least one topic, and the method includes obtaining a text entered by a user, determining at least one topic related to the text, and determining a target dialogue robot from the plurality of dialogue robots based on the at least one topic related to the text and a predefined mapping relationship between a dialogue robot and a topic, where at least one target topic corresponding to the target dialogue robot is some or all of the at least one topic related to the text, and allocating the text to the target dialogue robot and obtaining a reply for the text from the target dialogue robot, where the reply is generated by the target dialogue robot based on at least one semantic understanding of the text, and the at least one semantic understanding has a one-to-one correspondence with the at least one target topic.

Therefore, in this embodiment of this application, a plurality of dialogue robots are preconfigured, topic determining is performed on the text when the text entered by the user is received, and the text is allocated, based on the topic related to the text, to a corresponding dialogue robot for computing to generate the reply for the text. On the basis of understanding of a natural language, processing can be adaptively performed based on the topic related to the text, to generate an accurate reply, thereby improving user experience.

Optionally, before the determining at least one topic related to the text, the method further includes performing parameter training on the plurality of dialogue robots in parallel based on the predefined mapping relationship between a dialogue robot and a topic, where each dialogue robot is configured to perform the parameter training for the at least one corresponding topic.

A parameter obtained through the parameter training is an optimized parameter, and a dialogue robot on which the parameter training is performed can be used for human-computer dialogue.

Therefore, when a plurality of training samples are received, training samples of different topics may be allocated to different dialogue robots. The training samples are divided into a plurality of training sample sets based on topics, and each dialogue robot performs, for a corresponding topic, parameter training on one of the training sample sets. Therefore, the parameter training can be performed on the plurality of dialogue robots in parallel, an offline training time can be greatly reduced, and offline training efficiency can be improved.

Optionally, the determining at least one topic related to the text includes determining a correlation probability of each of a plurality of predefined topics based on the text entered by the user, where the correlation probability indicates a probability that the text is related to the topic, and determining, based on the correlation probability of each topic and a first preset threshold, the at least one topic related to the text, where a correlation probability of each of the at least one topic is greater than the first preset threshold.

Optionally, when the text is related to at least two topics, the determining a target dialogue robot from the plurality of dialogue robots based on the at least one topic related to the text and a predefined mapping relationship between a dialogue robot and a topic includes determining, based on the at least two topics related to the text and the predefined mapping relationship between a dialogue robot and a topic, whether there is a dialogue robot corresponding to the at least two topics, and when it is determined that there is a dialogue robot corresponding to the at least two topics, determining that the dialogue robot corresponding to the at least two topics is the target dialogue robot, where the target topic includes the at least two topics.

Optionally, the reply is generated by the target dialogue robot based on a target semantic understanding, and the target semantic understanding is obtained by the target dialogue robot based on the at least one semantic understanding of the text according to the following formula:

$$M = \frac{\sum_{i=1}^{N} P_i C_i}{\sum_{i=1}^{N} P_i}$$

where M represents a vector of the target semantic understanding, $P_i$ represents a correlation probability of the $i^{th}$ target topic, and $C_i$ represents a semantic understanding that is of the text and that is obtained by performing semantic understanding computing based on the $i^{th}$ target topic, where a value range of i is [1, N], i is a natural number, N represents a quantity of the target topics, and N is a natural number greater than 1.

Therefore, the target semantic understanding is computed based on a proportion of a correlation probability of each target topic. Computing can be performed based on a proportion of each target topic, to obtain a more accurate semantic understanding, thereby generating a more accurate reply.

Optionally, the reply includes at least one lexical item, a next lexical item in the reply is generated by the target dialogue robot based on a semantic understanding of a previous lexical item, and the semantic understanding of the previous lexical item is obtained by the target dialogue robot according to the following formula:

$$C_{t+1} = \sum_{i=1}^{N} \omega_i^t C_i$$

where $C_{t+1}$ represents a vector of a semantic understanding of the $t^{th}$ lexical item, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the text and that is obtained by performing semantic understanding computing based on the $i^{th}$ target topic, where a value range of t is [1, S], t is a natural number, S represents a quantity of lexical items included in the reply, S is a natural number greater than 1, a value range of i is [1, N], i is a natural number, N represents a quantity of the target topics, and N is a natural number greater than 1.

Optionally, the reply includes at least one lexical item, a next lexical item in the reply is generated by the target dialogue robot based on a semantic understanding of a previous lexical item, and the semantic understanding of the previous lexical item is obtained by the target dialogue robot according to the following formula:

$$C_{t+1} = \sum_{i=1}^{N} \left( \frac{P_i}{\sum_{i=1}^{N} P_i} + \omega_i^t \right) C_i$$

where $C_{t+1}$ represents a vector of a semantic understanding of the $t^{th}$ lexical item, $P_i$ represents a correlation probability of the $i^{th}$ target topic, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the text and that is obtained by performing semantic understanding computing based on the $i^{th}$ target topic, where a value range of t is [1, S], t is a natural number, S represents a quantity of lexical items included in the reply, S is a natural number greater than 1, a value range of i is [1, N], i is a natural number, N represents a quantity of the target topics, and N is a natural number greater than 1.

Therefore, a semantic understanding used to generate a next lexical item is computed based on a proportion of a correlation probability of each target topic and a previous lexical item in a reply, and computing can be performed based on each target topic and a currently generated reply, to obtain a more accurate semantic understanding, thereby adaptively generating a subsequent reply lexical item based on a topic and a generated reply lexical item.

Optionally, when the text is related to at least two topics, the determining a target dialogue robot from the plurality of dialogue robots based on the at least one topic related to the text and a predefined mapping relationship between a dialogue robot and a topic includes determining, based on the at least two topics related to the text and the predefined mapping relationship between a dialogue robot and a topic, whether there is a dialogue robot corresponding to the at least two topics, and when it is determined that there is no dialogue robot corresponding to the at least two topics, determining that a dialogue robot that corresponds to a topic having a highest correlation probability in the plurality of topics is the target dialogue robot.

Optionally, the determining, based on the correlation probability of each topic and a first preset threshold, the at least one topic related to the text includes determining whether a largest value of correlation probabilities of the plurality of topics is less than a second preset threshold, and when the largest value of the correlation probabilities of the plurality of topics is less than the second preset threshold, determining, based on the correlation probability of each topic and the first preset threshold, the at least one topic related to the text.

Optionally, the determining at least one topic related to the text, and determining a target dialogue robot from the plurality of dialogue robots based on the at least one topic related to the text and a predefined mapping relationship between a dialogue robot and a topic includes determining a correlation probability of each of a plurality of predefined topics based on the text entered by the user, where the correlation probability indicates a probability that the text is related to the topic, determining whether a largest value of correlation probabilities of the plurality of topics is less than a second preset threshold, when it is determined that the largest value of the correlation probabilities of the plurality of topics is greater than or equal to the second preset threshold, determining that a topic corresponding to the largest value of the correlation probabilities of the plurality of topics is the target topic, and determining, based on the predefined mapping relationship between a dialogue robot and a topic, that a dialogue robot corresponding to the target topic is the target dialogue robot.

Optionally, when the target dialogue robot corresponds to one target topic, the reply is generated by the target dialogue robot based on the semantic understanding of the text.

A single-topic dialogue robot and a multi-topic dialogue robot are comprehensively applied to topic allocation, and the target dialogue robot can be flexibly allocated based on the text entered by the user. Therefore, efficiency in replying the user can be improved, and in addition, reply accuracy can be ensured, thereby achieving balance between efficiency and an effect.

According to a second aspect, a parameter training method is provided, where the method is applied to a human-computer dialogue apparatus, where the apparatus is pre-equipped with a plurality of dialogue robots, each dialogue robot is configured to conduct a human-computer dialogue based on at least one topic, and the method includes obtaining a training sample, where the training sample includes a first sentence and a second sentence, and the first sentence and the second sentence constitute a dialogue, determining at least one topic related to the first sentence, and determining a target dialogue robot from the plurality of dialogue robots based on the at least one topic related to the first sentence and a predefined mapping relationship between a dialogue robot and a topic, where a target topic corresponding to the target dialogue robot is some or all of the at least one topic related to the first sentence, allocating the first sentence to the target dialogue robot and obtaining a reply sentence for the first sentence from the target dialogue robot, where the reply sentence is a reply generated by the target dialogue robot based on at least one semantic understanding of the first sentence, and the at least one semantic understanding has a one-to-one correspondence with the at least one target topic, and adjusting, based on the received second sentence and the reply sentence generated by the target dialogue robot, a parameter preset in the target dialogue robot.

Therefore, in this embodiment of this application, a plurality of dialogue robots are preconfigured, and when a plurality of training samples are received, training samples of different topics can be allocated to different dialogue robots. The training samples are divided into a plurality of training sample sets based on topics, and each dialogue robot performs, for a corresponding topic, parameter training on one of the training sample sets. Therefore, the parameter training can be performed on the plurality of dialogue robots in parallel, an offline training time can be greatly reduced, and offline training efficiency can be improved.

Optionally, the determining at least one topic related to the first sentence includes: determining a correlation probability of each of a plurality of predefined topics based on the first sentence entered by a user, where the correlation probability indicates a probability that the first sentence is related to the topic, and determining, based on the correlation probability of each topic and a first preset threshold, the at least one topic related to the first sentence, where a correlation probability of each of the at least one topic is greater than the first preset threshold.

Optionally, when the first sentence is related to at least two topics, the determining a target dialogue robot from the plurality of dialogue robots based on the at least one topic related to the first sentence and a predefined mapping relationship between a dialogue robot and a topic includes determining, based on the at least two topics related to the first sentence and the predefined mapping relationship between a dialogue robot and a topic, whether there is a dialogue robot corresponding to the at least two topics, and when it is determined that there is a dialogue robot corresponding to the at least two topics, determining that the dialogue robot corresponding to the at least two topics is the target dialogue robot, where the target topic includes the at least two topics.

Optionally, the reply sentence is generated by the target dialogue robot based on a target semantic understanding, and the target semantic understanding is obtained by the target dialogue robot based on the at least one semantic understanding of the first sentence according to the following formula:

$$M = \frac{\sum_{i=1}^{N} P_i C_i}{\sum_{i=1}^{N} P_i}$$

where M represents a vector of the target semantic understanding, $P_i$ represents a correlation probability of the $i^{th}$ target topic, and $C_i$ represents a semantic understanding that is of the first sentence and that is obtained by performing semantic understanding computing based on the $i^{th}$ target topic, where a value range of i is [1, N], i is a natural number, N represents a quantity of the target topics, and N is a natural number greater than 1.

Therefore, the target semantic understanding is computed based on a proportion of a correlation probability of each target topic. Computing can be performed based on a proportion of each target topic, to obtain a more accurate semantic understanding, thereby generating a more accurate reply sentence.

Optionally, the reply sentence includes at least one lexical item, a next lexical item in the reply sentence is generated by the target dialogue robot based on a semantic understanding of a previous lexical item, and the semantic understanding of the previous lexical item is obtained by the target dialogue robot according to the following formula:

$$C_{t+1} = \sum_{i=1}^{N} \omega_i^t C_i$$

where $C_{t+1}$ represents a vector of a semantic understanding of the $t^{th}$ lexical item, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the first sentence and that is obtained by performing semantic understanding computing based on the $i^{th}$ target topic, where a value range of t is [1, S], t is a natural number, S represents a quantity of lexical items included in the reply sentence, S is a natural number greater than 1, a value range of i is [1, N], i is a natural number, N represents a quantity of the target topics, and N is a natural number greater than 1.

Optionally, the reply sentence includes at least one lexical item, a next lexical item in the reply sentence is generated by the target dialogue robot based on a semantic understanding of a previous lexical item, and the semantic understanding of the previous lexical item is obtained by the target dialogue robot according to the following formula:

$$C_{t+1} = \sum_{i=1}^{N} \left( \frac{P_i}{\sum_{i=1}^{N} P_i} + \omega_i^t \right) C_i$$

where $C_{t+1}$ represents a vector of a semantic understanding of the $t^{th}$ lexical item, $P_i$ represents a correlation probability of the $i^{th}$ target topic, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the first sentence and that is obtained by performing semantic understanding computing based on the $i^{th}$ target topic, where a value range of t is [1, S], t is a natural number, S represents a quantity of lexical items included in the reply sentence, S is a natural number greater than 1, a value range of i is [1, N], i is a natural number, N represents a quantity of the target topics, and N is a natural number greater than 1.

Therefore, a semantic understanding used to generate a next lexical item is computed based on a proportion of a correlation probability of each target topic and a previous lexical item in a reply sentence, and computing can be performed based on each target topic and a currently generated reply sentence, to obtain a more accurate semantic understanding, thereby adaptively generating a subsequent reply lexical item based on a topic and a generated reply lexical item.

Optionally, when the first sentence is related to at least two topics, the determining a target dialogue robot from the plurality of dialogue robots based on the at least one topic related to the first sentence and a predefined mapping relationship between a dialogue robot and a topic includes determining, based on the at least two topics related to the first sentence and the predefined mapping relationship between a dialogue robot and a topic, whether there is a dialogue robot corresponding to the at least two topics, and when it is determined that there is no dialogue robot corresponding to the at least two topics, determining that a dialogue robot that corresponds to a topic having a highest correlation probability in the plurality of topics is the target dialogue robot.

Optionally, the determining, based on the correlation probability of each topic and a first preset threshold, the at least one topic related to the first sentence includes determining whether a largest value of correlation probabilities of the plurality of topics is less than a second preset threshold, and when the largest value of the correlation probabilities of the plurality of topics is less than the second preset threshold, determining, based on the correlation probability of each topic and the first preset threshold, the at least one topic related to the first sentence.

Optionally, the determining at least one topic related to the first sentence, and determining a target dialogue robot from the plurality of dialogue robots based on the at least one topic related to the first sentence and a predefined mapping relationship between a dialogue robot and a topic includes determining a correlation probability of each of a plurality of predefined topics based on the first sentence entered by the user, where the correlation probability indicates a probability that the first sentence is related to the topic, determining whether a largest value of correlation probabilities of the plurality of topics is less than a second preset threshold, when it is determined that the largest value of the correlation probabilities of the plurality of topics is greater than or equal to the second preset threshold, determining that a topic corresponding to the largest value of the correlation probabilities of the plurality of topics is the target topic, and determining, based on the predefined mapping relationship between a dialogue robot and a topic, that a dialogue robot corresponding to the target topic is the target dialogue robot.

Optionally, when the target dialogue robot corresponds to one target topic, the reply sentence is generated by the target dialogue robot based on the semantic understanding of the first sentence.

A single-topic dialogue robot and a multi-topic dialogue robot are comprehensively applied to topic allocation, and the target dialogue robot can be flexibly allocated based on the topic related to the obtained first sentence. Therefore, efficiency in generating the reply sentence can be improved, and in addition, accuracy of the reply sentence can be ensured, thereby achieving balance between efficiency and an effect.

According to a third aspect, a human-computer dialogue apparatus is provided, and is configured to perform the method according to any one of the first aspect or the possible implementations of the first aspect. Specifically, the apparatus may include units configured to perform the method according to any one of the first aspect or the possible implementations of the first aspect.

According to a fourth aspect, a parameter training apparatus is provided, and is configured to perform the method according to any one of the second aspect or the possible implementations of the second aspect. Specifically, the apparatus may include units configured to perform the method according to any one of the second aspect or the possible implementations of the second aspect.

According to a fifth aspect, a human-computer dialogue device is provided, and includes a memory and a processor. The memory is configured to store a computer program, and the processor is configured to invoke the computer program from the memory and run the computer program, so that the human-computer dialogue device performs the method according to any one of the first aspect or the possible implementations of the first aspect.

According to a sixth aspect, a parameter training device is provided, and includes a memory and a processor. The memory is configured to store a computer program, and the processor is configured to invoke the computer program from the memory and run the computer program, so that the parameter training device performs the method according to any one of the second aspect or the possible implementations of the second aspect.

According to a seventh aspect, a computer readable storage medium is provided, and is configured to store a computer program. The computer program includes an instruction used to perform the method according to any one of the first aspect or the possible implementations of the first aspect.

According to an eighth aspect, a computer readable storage medium is provided, and is configured to store a computer program. The computer program includes an instruction used to perform the method according to any one of the second aspect or the possible implementations of the second aspect.

In the embodiments of this application, the plurality of dialogue robots are preconfigured, topic determining is performed on the text when the text entered by the user is received, and the text is allocated, based on the topic related to the text, to the corresponding dialogue robot for computing to generate the reply for the text. Therefore, on the basis of understanding of a natural language, processing can be adaptively performed based on the topic related to the text, to generate an accurate reply, thereby improving user experience.

DESCRIPTION OF EMBODIMENTS

The following describes the technical solutions of this application with reference to the accompanying drawings.

With development of deep learning, a "sequence-to-sequence" learning (sequence-to-sequence learning) model based on a deep neural network architecture is proposed in academia. A natural language dialogue technology based on a deep neural network is used to obtain a natural language dialogue system in large-scale dialogue corpus training. The system receives a sequence entered by a user, then performs computing through a multi-layer neural network, and outputs a reply sequence word by word.

Figure 1:
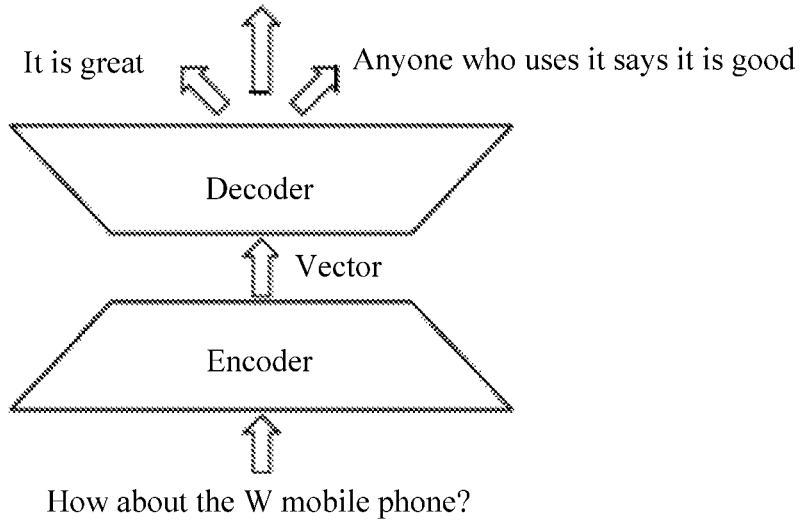
FIG. 1 is a schematic diagram of a generative dialogue technology.

FIG. 1 is a schematic diagram of an architecture of a generative dialogue model. As shown in FIG. 1, the architecture of the generative dialogue model includes an encoder (Encoder) and a decoder (Decoder). An encoder-decoder framework may be considered as a model in the text processing field, and may be understood as a general processing model that generates one sentence from another sentence.

Specifically, an input natural language is converted into intermediate representation vectors (also referred to as semantic understanding vectors) by the encoder, and then the intermediate representation vectors are sequentially generated into an output natural language by the decoder. The decoder and the encoder may be separately implemented by a recurrent neural network (RNN).

As a machine learning model, a generative dialogue robot based on a neural network model may have two phases, offline training and online running.

The offline training phase means that based on a training sample, a likelihood function of the training sample is maximized using a backpropagation algorithm, a stochastic gradient descent algorithm, or the like, to determine parameters of units in a neural network system, so that the parameters of the units are adjusted to an optimal state. For example, for a training dialogue pair <X, Y>, a sentence X is entered, to expect to generate a target output sentence Y using the encoder-decoder framework. However, an output sentence obtained by a robot through deep learning is Y'. Therefore, the machine learning model may adjust a parameter based on a similarity between Y and Y'. An adjusted parameter can make the reply sentence Y' output by the robot be closer to the target output sentence Y or completely the same as the target output sentence Y.

In this embodiment of this application, for example, used training data may include such dialogue pairs as:
Q: I want to go to Shanghai tomorrow.
A: Please choose a class.
Q: Any class is OK.
A: OK, let me check it out.

For another example, used training data may include such dialogue pairs as:
Q: I want to buy a mobile phone.
A: Which brand do you like?
Q: How about the W mobile phone?
A: Anyone who uses it says it is good.

The generative dialogue robot may adjust the parameter to an optimal state by learning a large quantity of dialogue pairs. In other words, an offline training process is a parameter optimization process.

The generative dialogue robot obtained through the offline training can run online. The generative dialogue robot that runs online uses a natural language sentence of a user as an input, generates a natural language reply through computing of the units in the neural network model, and returns a natural language reply to the user.

In current technologies, to make the dialogue robot output a relatively accurate natural language reply closer to a human language, a large quantity of dialogue pairs need to be learned in the offline training phase. For example, if four million pairs of dialogue pairs need to be learned, even if a mainstream graphics processing unit (GPU) is used for acceleration, usually a training time of about two weeks is needed, if hundreds of millions of dialogue pairs need to be learned, a training time of 50 weeks, namely, about a year, may be needed.

In view of this, this application provides a human-computer dialogue method and apparatus. A dialogue robot may be trained based on a topic to improve accuracy of a reply of the dialogue robot, so that the dialogue robot adaptively generates an accurate reply based on dialogue content.

To help understand embodiments of this application, first, a communications system to which the human-computer dialogue method and apparatus in the embodiments of this application are applied is described in detail with reference to FIG. 2.

Figure 2:
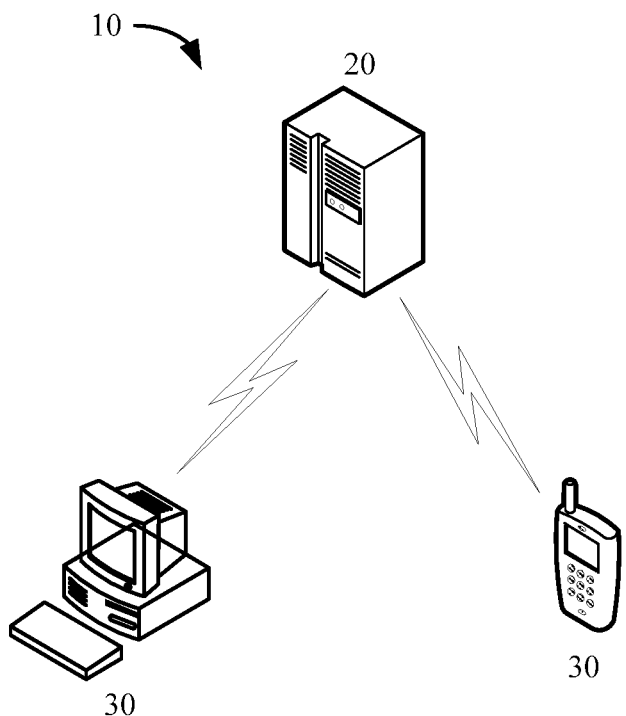
FIG. 2 is a schematic diagram of a communications system to which a human-computer dialogue method and apparatus in embodiments of this application are applied.

FIG. 2 is a schematic diagram of a communications system 10 to which a human-computer dialogue method and apparatus in embodiments of this application are applied. As shown in FIG. 2, the communications system 10 may include a cloud server 20 (which may be understood as a server) and a terminal device 30 (which may be understood as a client). The human-computer dialogue apparatus may be deployed in the cloud server 20. The cloud server 20 is configured to implement a computing function to provide a service for the terminal device 30. For example, in this embodiment of this application, the cloud server 20 is configured to implement deep learning and computing functions of a neural network model, and provide a human-computer dialogue service for the terminal device 30.

In an embodiment, a dialogue robot is implemented based on a neural network. In other words, a neural network system is an implementation of the dialogue robot. In a specific implementation process, each dialogue robot may be understood as a program, and performs computing based on a processor (for example, a Central Processing Unit (CPU) or a Graphics Processing Unit (GPU)) in the cloud server. Specifically, after offline training is performed on the dialogue robot to obtain an optimized parameter, the parameter obtained by the training may be stored in a memory of the cloud server. When the dialogue robot runs online, the parameter stored in the memory may be loaded, and online computing is performed using a computing resource allocated by the cloud server. During online running, the cloud server may allocate the computing resource to the dialogue robot as required, for example, allocate one or more processors to each dialogue robot to reduce concurrent problems that may be caused when a plurality of dialogue robots perform computing simultaneously, or allocate one processor to a plurality of dialogue robots based on a current computing quantity, that is, the plurality of dialogue robots share one processor. This is not particularly limited in this application, and this is not a core of this application. Brief descriptions are provided herein merely to help understand the dialogue robot in this embodiment of this application.

It should be understood that the cloud server may include one or more servers. The one or more servers may be deployed in a same physical device or may be deployed in a group of physical devices in a distributed manner to constitute a server cluster, to expand bandwidth of a network device and a server, increase a throughput, enhance a network data processing capability, and improve flexibility and availability of a network.

The cloud server may be communicatively connected to a plurality of terminal devices. The terminal device sends a natural sentence (for ease of distinguishing and description, a natural sentence is denoted as a first sentence) entered by a user to the cloud server. The cloud server performs computing based on the received first sentence to obtain a reply sentence (for ease of distinguishing and description, the reply sentence is denoted as a second sentence) for the first sentence, and presents the second sentence to the user using the terminal device.

In this embodiment of this application, the terminal device may be a mobile terminal, mobile user equipment, or the like, for example, may be a portable mobile apparatus, a pocket-sized mobile apparatus, a handheld mobile apparatus, a computer built-in mobile apparatus, or an in-vehicle mobile apparatus, which exchanges a language and/or data with a radio access network. In addition, the user equipment may be a device, such as a computer, that accesses a server through an Ethernet, an optical fiber, or the like.

The terminal device is equipped with an input apparatus and an output apparatus. Therefore, the user may operate the input apparatus to implement a dialogue with a robot, and receive, using the output apparatus, a sentence replied by the robot. By way of example but not limitation, the input apparatus may be, for example, one or more of a touch operation detection apparatus, a gesture operation detection apparatus, a keyboard, a mouse, or a voice recognition apparatus. The output apparatus may be, for example, a display screen, or a speaker.

In addition, the terminal device may communicate with one or more core networks using a radio access network (RAN). The radio access network may use various communications systems, such as a global system for mobile communications (GSM), a code division multiple access (CDMA) system, a wideband code division multiple access (WCDMA) system, a general packet radio service (GPRS) system, and a long term evolution (LTE) system.

A human-computer dialogue method according to an embodiment of this application is described below in detail with reference to FIG. 3.

Figure 3:
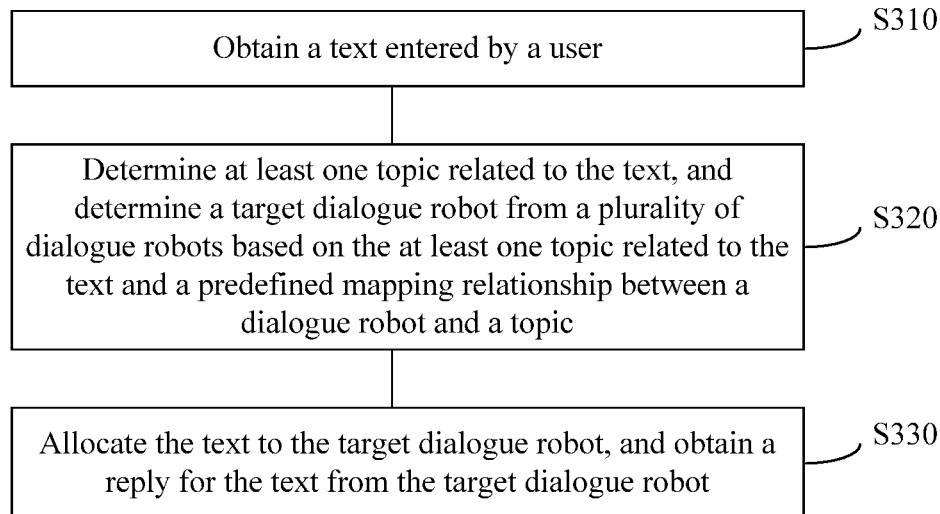
FIG. 3 is a schematic flowchart of a human-computer dialogue method according to an embodiment of this application.

FIG. 3 is a schematic flowchart of a human-computer dialogue method 300 according to an embodiment of this application. The method may be applied to a human-computer dialogue apparatus. The apparatus is pre-equipped with a plurality of dialogue robots, and each dialogue robot is configured to conduct a human-computer dialogue based on at least one topic.

The human-computer dialogue apparatus in this embodiment of this application may be understood as a machine learning model (or a neural network model) having a human-machine dialogue function. After being established, the model can run online only after parameter training. A method for performing parameter training on the human-computer dialogue apparatus is described below in detail with reference to FIG. 8. For brevity, details are not described herein.

In this embodiment of this application, the human-computer dialogue method 300 may be performed by the human-computer dialogue apparatus, and specifically, may be performed by a processor in the apparatus. As shown in FIG. 3, the method 300 includes the following steps:

S310. Obtain a text entered by a user.

In an embodiment, the apparatus may obtain, from a terminal device, the text entered by the user, and the text may be a natural language sentence. It may be understood that the text may be a sentence entered by the user, for example, may be a question, an instruction, a request, or the like. The text entered by the user is not particularly limited in this application.

S320. Determine at least one topic related to the text, and determine a target dialogue robot from the plurality of dialogue robots based on the at least one topic related to the text and a predefined mapping relationship between a dialogue robot and a topic.

In an embodiment, after obtaining the natural language text entered by the user, the topic related to the text and a correlation probability of each topic may be determined through computing. A correlation probability of the $i^{th}$ (i is a natural number) topic indicates a probability (or possibility) that the received natural language text is related to the $i^{th}$ topic.

The apparatus may determine the topic related to the text and the correlation probability in an unsupervised manner or a supervised manner.

The unsupervised manner may be understood as automatic discovering, using the machine learning model, topic distribution of each text from a large quantity of historical entered texts of a user. For example, a document topic generation model (Latent Dirichlet Allocation (LDA)) may be used to perform automatic discovery of a topic.

The supervised manner means first performing, in a manual annotation manner, topic annotation on the text entered by the user, and then training a mapping from an entered text to a topic distribution probability using a supervised machine learning model. After the text entered by the user is received, the correlation probability of each topic may be computed based on this model. For example, an RNN or a convolutional neural network (CNN) may be used to perform topic computing.

It should be understood that the foregoing listed processes of computing the correlation probability of the topic in the unsupervised manner and the supervised manner may be implemented by an algorithm. For brevity, detailed descriptions of specific processes thereof are omitted herein. In addition, the foregoing listed methods for computing a correlation probability of a topic are both examples for description, and should not be construed as any limitation on this application.

Optionally, the determining at least one topic related to the text includes determining a correlation probability of each of a plurality of predefined topics based on the text entered by the user, where the correlation probability indicates a probability that the text is related to the topic, and determining, based on the correlation probability of each topic and a first preset threshold, the at least one topic related to the text, where a correlation probability of each of the at least one topic is greater than the first preset threshold.

It may be understood that the text entered by the user may be related to a plurality of topics, but a probability that the text is related to each topic may vary. In this embodiment of this application, assuming that Q (Q is a natural number greater than or equal to 1) topics are predefined and a probability that the text is related to the $i^{th}$ topic is $P_i$, $$\sum_{i=1}^{Q} P_i = 1.$$

For example, if an entered text (for example, denoted as a text 1) is "How about the W mobile phone", a distribution vector $[P_1=0.8, P_2=0.2, \ldots, P_Q=0.0]$ related to topics may be computed by a topic determining module, where $P_1$ represents a probability that the text is related to a science and technology topic, $P_2$ represents a probability that the text is related to a consumption topic, and $P_Q$ represents a probability that the text is related to an entertainment topic. For another example, if an entered text (for example, denoted as a text 2) is "Peter declares a divorce by microblogging and competes for custody of two children", a distribution vector $[P_1=0.0, P_2=0.0, P_3=0.45, \ldots, P_Q=0.5]$ related to topics may be computed by a topic determining module, where $P_3$ represents a probability that the text is related to a law topic, and $P_Q$ represents a probability that the text is related to an entertainment topic.

It can be learned based on the correlation probability of each topic that the topics related to the text 1 may be science and technology, and consumption, or only science and technology, and the topics related to the text 2 may be entertainment and law.

The apparatus may further determine, based on the first preset threshold, the topic related to the text. For example, assuming that the first preset threshold is 0.4, it may be determined that the topic related to the text 1 is science and technology, and the topics related to the text 2 are entertainment and law.

Furthermore, because a probability that some entered texts are related to a specific topic is very large, and the entered texts are related only to the specific topic, in this case, the topic related to the text may be determined directly based on a correlation probability of the specific topic. If there is a topic whose correlation probability value is very large in correlation probabilities of a plurality of topics obtained through computing, it may be considered that the text is related to the topic, otherwise, it may be considered that the text may be related to a plurality of topics, and the plurality of topics related to the text may be determined according to the foregoing described method.

Optionally, the determining, based on the correlation probability of each topic and a first preset threshold, the at least one topic related to the text includes determining whether a largest value of correlation probabilities of the plurality of topics is less than a second preset threshold, and when the largest value of the correlation probabilities of the plurality of topics is less than the second preset threshold, determining, based on the correlation probability of each topic and the first preset threshold, the at least one topic related to the text.

After the correlation probability of each topic is computed, it may be first determined whether the largest value of the correlation probabilities of the plurality of topics is less than a preset threshold (for ease of distinguishing and description, the preset threshold is denoted as the second preset threshold). If the largest value of the correlation probabilities of the plurality of topics is less than the second preset threshold, at least one topic whose correlation probability is greater than the first preset threshold is further determined according to the foregoing method, otherwise, a topic whose correlation probability is greater than the second preset threshold may be directly used as the topic related to the text.

It should be noted that the second preset threshold is greater than the first preset threshold. In addition, in the correlation probabilities of the plurality of topics, there may be only one or no topic whose correlation probability is greater than the second preset threshold. In other words, a value of the second preset threshold is greater than 0.5.

After the at least one topic related to the text is determined, it is further necessary to determine the target dialogue robot that can perform computing on the at least one topic. It is already noted above that each dialogue robot corresponds to at least one topic, but it cannot be ensured that the topic that is of the text and that is obtained through computing using the method described above has a mapping relationship with a predefined dialogue robot.

The target dialogue robot may be determined based on the predefined mapping relationship between a dialogue robot and a topic, so that a topic (for ease of distinguishing and description, the topic is denoted as a target topic) corresponding to the target dialogue robot is some or all of the at least one topic that is related to the text and that is determined using the method described above.

Optionally, when the text is related to at least two topics, the determining a target dialogue robot from the plurality of dialogue robots based on the at least one topic related to the text and a predefined mapping relationship between a dialogue robot and a topic includes determining, based on the at least two topics related to the text and a mapping relationship between the plurality of dialogue robots and a plurality of topics, whether there is a dialogue robot corresponding to the at least two topics, and when it is determined that there is a dialogue robot corresponding to the at least two topics, determining that the dialogue robot corresponding to the at least two topics is the target dialogue robot.

For example, it is assumed that topics obtained by computing the text include a topic B and a topic C, and it may be determined based on the predefined mapping relationship between a dialogue robot and a topic that there is a dialogue robot corresponding to the topic B and the topic C in a plurality of predefined dialogue robots. In this case, it may be further determined that the dialogue robot corresponding to the topic B and the topic C is the target dialogue robot, and the topic B and the topic C are target topics.

Optionally, when the text is related to at least two topics, the determining a target dialogue robot from the plurality of dialogue robots based on the at least one topic related to the text and a predefined mapping relationship between a dialogue robot and a topic includes determining, based on the at least two topics related to the text and a mapping relationship between the plurality of dialogue robots and a plurality of topics, whether there is a dialogue robot corresponding to the at least two topics, and when it is determined that there is no dialogue robot corresponding to the at least two topics, determining that a dialogue robot that corresponds to a topic having a highest correlation probability in the plurality of topics is the target dialogue robot.

For example, it is assumed that topics obtained by computing the text include a topic A and a topic B, and it may be determined, based on the mapping relationship that is predefined in the apparatus and that is between a dialogue robot and a topic, that there is no dialogue robot corresponding to the topic A and the topic B in a plurality of predefined dialogue robots. In this case, a topic corresponding to the largest value of the correlation probabilities may be determined from the topic A and the topic B. Assuming that the topic corresponding to the largest value of the correlation probabilities is the topic A, it may be further determined that a dialogue robot corresponding to the topic A is the target dialogue robot, and the topic A is a target topic.

The method for determining a target dialogue robot described above may be applied to a scenario in which an entered text is related to a plurality of topics. If the text entered by the user may be related only to a specific topic, a correlation probability of the topic is relatively large, for example, is greater than the foregoing second preset threshold. In this case, the target dialogue robot may be determined directly based on the topic related to the text.

Optionally, S320 may include determining a correlation probability of each of a plurality of predefined topics based on the text entered by the user, where the correlation probability indicates a probability that the text is related to the topic, determining whether a largest value of correlation probabilities of the plurality of topics is less than a second preset threshold, when it is determined that the largest value of the correlation probabilities of the plurality of topics is greater than or equal to the second preset threshold, determining that a topic corresponding to the largest value of the correlation probabilities of the plurality of topics is the target topic, and determining, based on the predefined mapping relationship between a dialogue robot and a topic, that a dialogue robot corresponding to the target topic is the target dialogue robot.

When the largest value of the correlation probabilities is greater than or equal to the second preset threshold, the topic corresponding to the largest value of the correlation probabilities is directly determined as the target topic, and the corresponding dialogue robot is determined as the target dialogue robot. In this case, the target topic is the topic related to the text.

It should be understood that the foregoing listed first preset threshold and second preset threshold are merely used to distinguish between two different thresholds, and do not constitute any limitation on this application. The first preset threshold and the second preset threshold may be manually predefined, or determined based on experience. This is not particularly limited in this application.

S330. Allocate the text to the target dialogue robot, and obtain a reply for the text from the target dialogue robot.

The reply is generated by the target dialogue robot based on at least one semantic understanding of the text. In addition, the at least one semantic understanding has a one-to-one correspondence with at least one target topic.

It should be understood that each dialogue robot may be understood as a program running on the processor. In this embodiment of this application, the plurality of dialogue robots may independently run on a plurality of independent processors, and one dialogue robot runs on each processor. The plurality of dialogue robots may alternatively run on a same processor. This is not particularly limited in this application.

Herein, without loss of generality, a specific process of generating a reply is described in detail using a process of processing the text by the target dialogue robot as an example. It may be understood that the target dialogue robot is one of the plurality of dialogue robots, each dialogue robot may become a target dialogue robot of a sentence entered by a user, and a corresponding topic is a related topic of the sentence entered by the user. After each dialogue robot receives a sentence allocated by a topic allocation unit, processing manners of the sentence are similar. However, in a computing process, parameters in any two dialogue robots are at least partially different. Therefore, obtained replies may also be different.

In an embodiment, the target dialogue robot is configured to perform semantic understanding computing on the text based on the at least one corresponding target topic, to obtain at least one semantic understanding, and generate the reply for the text based on the at least one semantic understanding.

Optionally, the target dialogue robot includes an understanding module, a generation module, and a talking module.

The understanding module is configured to perform semantic understanding computing on the received text. The generation module is configured to perform computing based on a semantic understanding obtained through computing by one or more understanding modules, to obtain a target semantic understanding to be input into the talking module. The talking module is configured to generate the reply for the text based on the target semantic understanding, and send the reply to the terminal device.

In an embodiment, the understanding module first decomposes the received natural language text into a plurality of lexical items by text segmentation processing, and each lexical item corresponds to a high-dimensional vector. It is assumed that an entered natural language text is a sequence $x=(x_1, x_2, \ldots, x_T)$, that is, the natural language text is decomposed into T lexical items, corresponding to $x_1$, $x_2, \ldots, x_T$, respectively. $x_i$ is a high-dimensional vector. This is because, when the understanding module performs computing on the entered natural language text, as the natural language cannot be understood, the natural language is first converted into a vector that can be understood by a machine. Each high-dimensional vector may be understood as a vector used to uniquely indicate a lexical item, and a relationship between vectors is similar to a relationship between corresponding lexical items. For example, there is an association relationship between "dad" and "male" and between "mother" and "female".

It should be noted that the text segmentation processing is a commonly used technical approach used to identify a lexical item in a sentence. The text segmentation may be implemented using an existing tool (for example, an open-source text segmentation tool). For brevity, detailed descriptions of a processing process thereof are omitted herein.

It should be further noted that the method for indicating a lexical item may be performed using a high-dimensional vector. For brevity, detailed descriptions of a processing process thereof are omitted herein.

For ease of understanding and explanation, the following separately describes two cases. The target dialogue robot corresponds to one target topic (case 1) and the target dialogue robot corresponds to at least two target topics (case 2).

It may be understood that case 1 may be as follows. After the correlation probabilities of the plurality of topics are computed, it is determined that the largest value of the correlation probabilities of the plurality of topics is greater than or equal to the second preset threshold, and the topic corresponding to the maximum value is determined as the target topic. Case 1 may alternatively be as follows. After the correlation probabilities of the plurality of topics are computed, it is determined that the largest value of the correlation probabilities of the plurality of topics is less than the second preset threshold, and at least one topic that is greater than the first preset threshold is further determined. However, a dialogue robot that corresponds to the at least one topic does not exist in the plurality of predefined dialogue robots. Therefore, the topic that corresponds to the largest value of the correlation probabilities is determined as the target topic. Case 2 is as follows. After the correlation probabilities of the plurality of topics are computed, it is determined that the largest value of the correlation probabilities of the plurality of topics is less than the second preset threshold, and at least one topic that is greater than the first preset threshold is further determined. It is determined that a dialogue robot that corresponds to the at least one topic exists in the plurality of predefined dialogue robots. Therefore, the at least one topic is determined as the target topic.

Case 1.

Optionally, when the target dialogue robot corresponds to one target topic, the reply is generated by the target dialogue robot based on the semantic understanding of the text.

In an embodiment, in the target dialogue robot, the understanding module is configured to perform the semantic understanding computing on the text based on the target topic to obtain the semantic understanding of the text, the generation module is configured to determine the semantic understanding as the target semantic understanding, and the talking module is configured to generate the reply for the text based on the target semantic understanding.

Figure 4:
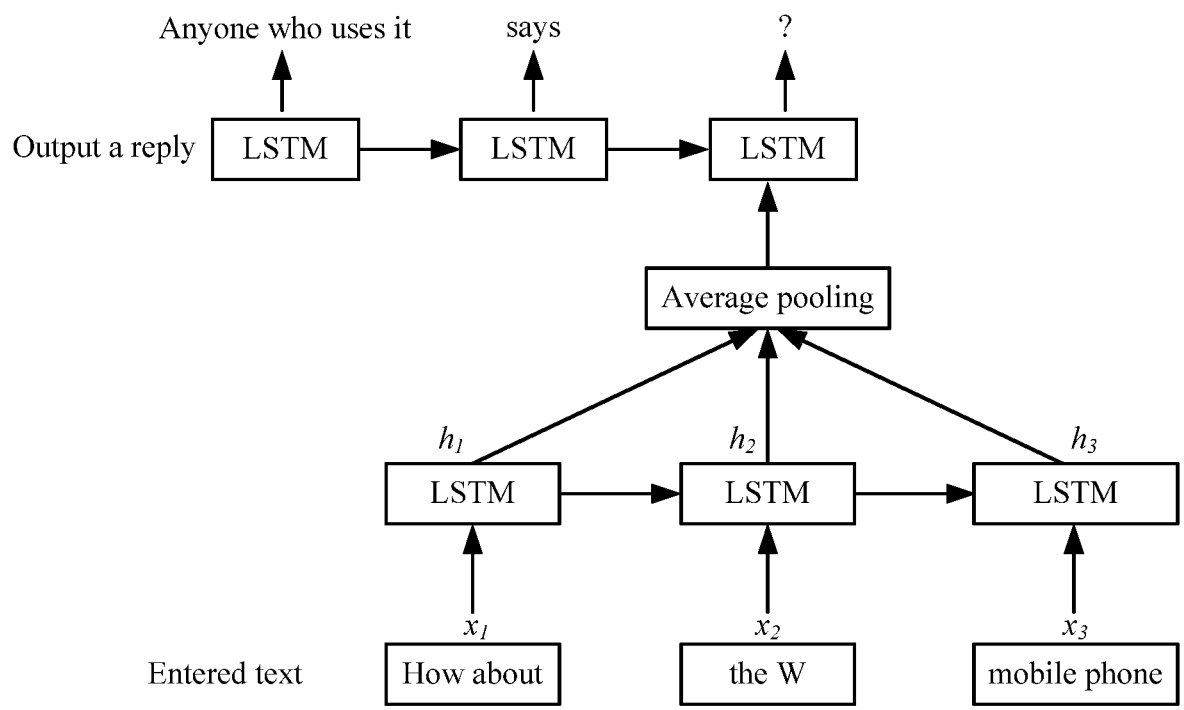
FIG. 4 is a schematic diagram of performing semantic understanding computing on a currently entered text and generating a reply.

FIG. 4 is a schematic diagram of performing semantic understanding computing on a currently entered text and generating a reply.

As shown in FIG. 4, for example, an entered sentence "How about the W mobile phone" may be decomposed into, "How about", "the W", and "mobile phone", and each lexical item can be represented using a high-dimensional vector. For example, "How about", "the W", and "mobile phone" correspond to $x_1$, $x_2$, and $x_3$, respectively, where "How about" corresponds to the vector $x_1$, "the W" corresponds to the vector $x_2$, and "mobile phone" corresponds to the vector $x_3$.

After the entered sentence is decomposed into a plurality of high-dimensional vectors, an understanding module further performs semantic understanding computing on the plurality of high-dimensional vectors based on corresponding topics. In an embodiment, a semantic understanding corresponding to each lexical item may be computed using a neural network model (for example, an RRN or a CNN). For example, a vector $h_1$ is a vector representation of a semantic understanding of the vector $x_1$, a vector $h_2$ is a vector representation of a semantic understanding from the vector $x_1$ at the beginning of the sentence to the vector $x_2$, and a vector $h_3$ is a semantic understanding from the vector $x_1$ at the beginning of the sentence to the vector $x_3$. A basic computing unit in an RNN neural network is $h_i=\text{Cell}(x_i, h_{i-1}, W)$, where Cell( ) represents a nonlinear function, W represents a parameter in the model, $x_i$ represents a parameter input into the model, and $h_i=\text{Cell}(x_i, h_{i-1}, W)$ indicates that $h_i$ may be obtained by computing $x_i$ and $h_{i-1}$. It should be noted that different Cell( ) functions correspond to different neural networks, for example, a recurrent neural network (Long Short Term Memory, LSTM). A specific function of Cell( ) is not particularly limited in this application. A vector representation of a semantic understanding obtained through Cell( ) computing may be implemented using a neural network. This is not a core of this application, and details are not described herein.

After a semantic understanding of each lexical item is obtained through computing, the understanding module may perform further processing to obtain a semantic understanding of an entire sentence. In this embodiment of this application, a high-dimensional vector representation $\bar{h}$ of the entire sentence can be obtained using an average pooling method. The average pooling computing method is $$\bar{h} = \frac{1}{n}\sum_{i=1}^{N} h_i,$$

which means averaging n vectors $h_i$. The vector $\bar{h}$ obtained through average pooling is a vector representation of a semantic understanding of the sentence "How about the W mobile phone" based on the neural network model.

In case 1, because the target dialogue robot corresponds to one topic, the semantic understanding is the target semantic understanding input into a talking module.

Further, to obtain a more accurate semantic understanding, the target dialogue robot may further include a generation module. The generation module may combine a semantic understanding of a historical dialogue with a semantic understanding of a current text, to obtain a target semantic understanding of the current text.

After the generation module generates the target semantic understanding, the target semantic understanding is input into the talking module, and the talking module may generate a reply for the text based on the target semantic understanding.

In an embodiment, the talking module may gradually generate a complete reply based on a currently generated dialogue. For example, in FIG. 4, after a part of the reply "Anyone who uses it says" has been generated, a next word may be generated based on an input from the understanding module. The generated part of the reply "Anyone who uses it says" is indicated by a vector, and then a vector of the next word (for example, "it is good") is generated with reference to the target semantic understanding.

Figure 5:
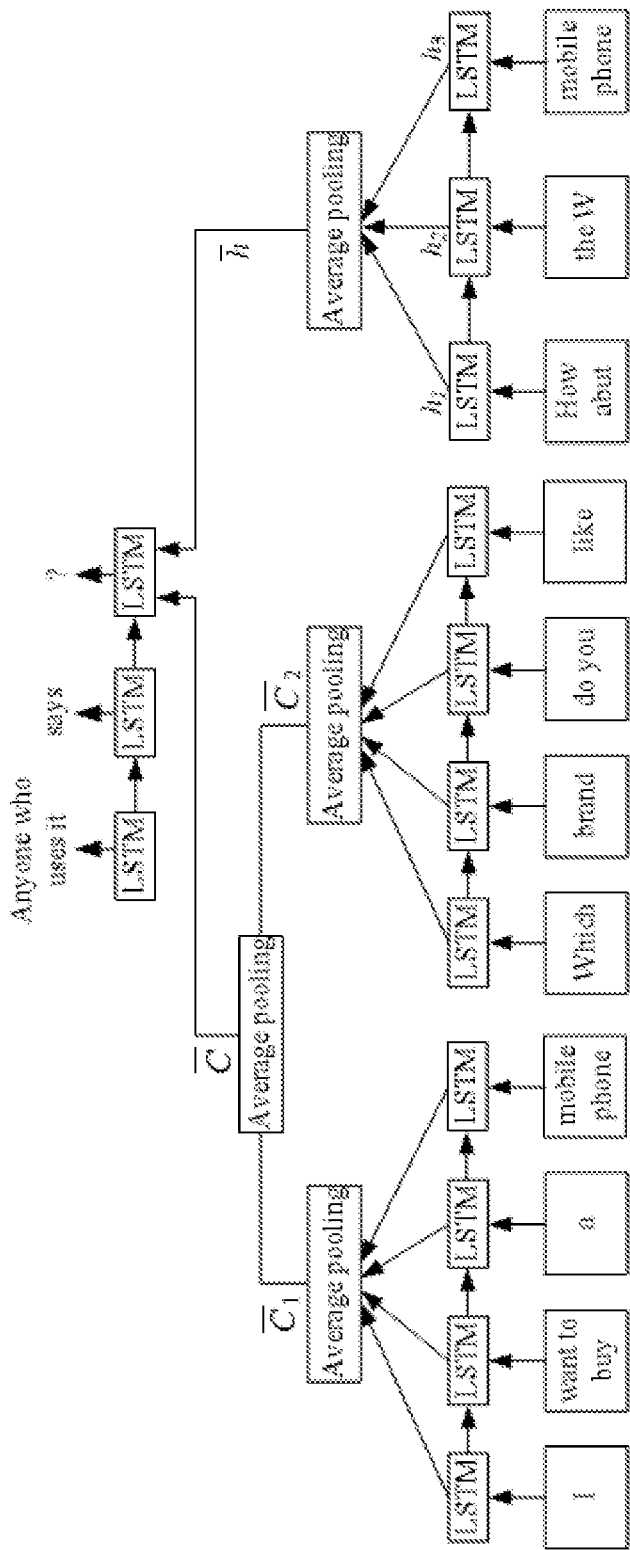
FIG. 5 is a schematic diagram of performing semantic understanding computing based on a historical dialogue and a currently entered text.

FIG. 5 is a schematic diagram of performing semantic understanding computing based on a historical dialogue and a currently entered text. As shown in FIG. 5, before the currently entered text "How about the W mobile phone", historical dialogues "I want to buy a mobile phone" and "Which brand do you like" are also stored. Using the semantic understanding computing method described above, the understanding module may obtain a semantic understanding of each sentence, and then may obtain a vector representation of semantic understandings of the historical dialogues through average pooling. For example, a vector representation of the semantic understanding of "I want to buy a mobile phone" is $\overline{C}_1$, a vector representation of the semantic understanding of "Which brand do you like" is $\overline{C}_2$, and a vector representation, obtained through average pooling, of the semantic understandings of the historical dialogues is $\overline{C}$. In addition, a vector representation of a semantic understanding of a currently entered text obtained as described above is $\overline{h}$. A generation module may combine a semantic understanding of the historical dialogue with the semantic understanding of the current text, to obtain a target semantic understanding of the historical dialogue and the currently entered text as follows: M=[$\overline{C}$, $\overline{h}$], in other words, column vectors $\overline{C}$ and $\overline{h}$ are connected in series to constitute a longer vector, namely, a target semantic understanding to be input into the talking module.

It should be noted that an entered text of the historical dialogue and a vector representation of a semantic understanding of each sentence in the historical dialogue may be stored in a memory. The memory may be a memory in a cloud server. The memory may be a resource allocated to the target dialogue robot by the cloud server. In an embodiment, the memory may be a storage resource separately allocated to the target dialogue robot, or may be a storage resource allocated to and shared by a plurality of dialogue robots (including the target dialogue robot).

Case 2.

When the text is related to two or more target topics, the generation module may perform, based on correlation probabilities of target topics, weighted combination on semantic understandings entered by understanding modules.

Optionally, the target dialogue robot may include at least two understanding modules, one generation module, and one talking module.

Each understanding module corresponds to one topic, and is configured to perform semantic understanding on a plurality of decomposed high-dimensional vectors based on the corresponding topic. The generation module is configured to generate a target semantic understanding based on at least two semantic understandings obtained through computing by the at least two understanding modules. The talking module is configured to generate a reply for the text based on the target semantic understanding.

It should be noted that when the target dialogue robot corresponds to at least two target topics, the semantic understanding computing may be separately performed on a topic using the at least two understanding modules. The at least two understanding modules may be understood as mutually independent understanding modules, and the semantic understanding computing can be performed on the text in parallel, thereby reducing a computing time.

Figure 6:
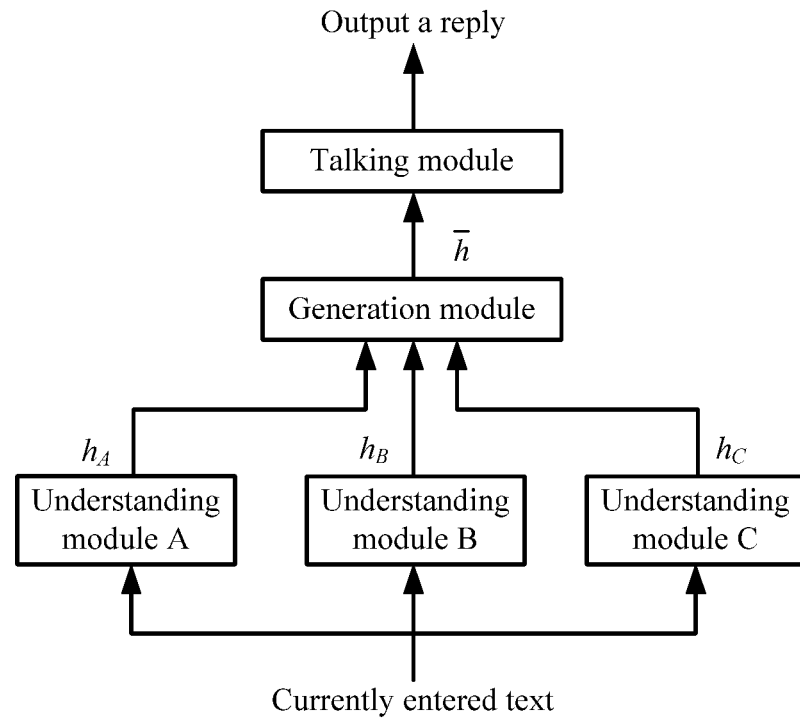
FIG. 6 is another schematic diagram of performing semantic understanding computing on a currently entered text.

FIG. 6 is another schematic diagram of performing semantic understanding computing on a currently entered text.

As shown in FIG. 6, it is assumed that the target dialogue robot corresponds to three topics (for example, a topic A, a topic B, and a topic C), that is, the target dialogue robot includes three understanding modules (for example, an understanding module A, an understanding module B, and an understanding module C).

After an entered sentence is decomposed into a plurality of high-dimensional vectors, each understanding module further performs semantic understanding computing on the plurality of high-dimensional vectors based on a corresponding topic, to compute a semantic understanding that is of the text and that is obtained based on the corresponding topic. For a specific computing process, refer to the description in case 1. It should be noted that because a topic corresponding to each understanding module varies, the parameter in the model also varies in the foregoing computing process. Therefore, a semantic understanding obtained by computing a same sentence by each understanding module based on the corresponding topic also varies. For example, corresponding to the foregoing topic A, topic B, and topic C, the understanding module A, the understanding module B, and the understanding module C may perform computing to obtain vector representations $h_A$, $h_B$, and $h_c$ of corresponding semantic understandings. The generation module combines the vector representations $h_A$, $h_B$, and $h_C$ of the semantic understandings, and may obtain a vector identifier $\overline{h}$ of a target semantic understanding.

A parameter in each understanding module may also be made optimal through the foregoing offline training.

After the at least two understanding modules perform computing to obtain vector representations of semantic understandings of different topics of a same text, the generation module combines vector representations of at least two semantic understandings, to obtain a target semantic understanding, where the target semantic understanding is input into a talking module.

Further, the generation module may combine a semantic understanding of a historical dialogue with a semantic understanding of a current text, to obtain a target semantic understanding of the current text.

Figure 7:
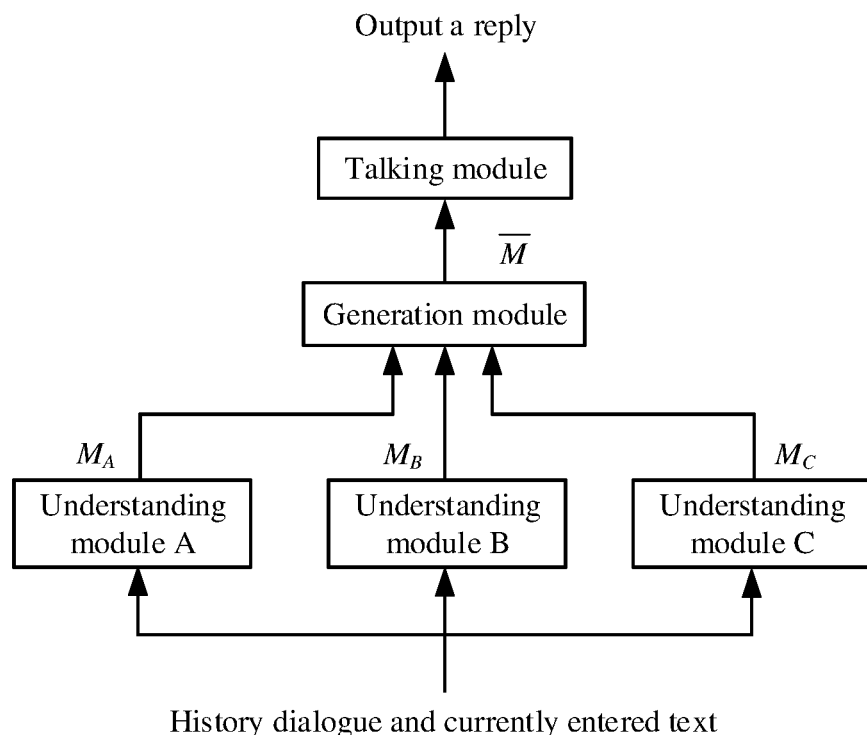
FIG. 7 is another schematic diagram of performing semantic understanding computing based on a historical dialogue and a currently entered text.

FIG. 7 is another schematic diagram of performing semantic understanding computing based on a historical dialogue and a currently entered text. As shown in FIG. 7, before the currently entered text "How about the W mobile phone", historical dialogues "I want to buy a mobile phone" and "Which brand do you like" are also stored. Using the semantic understanding computing method described above, understanding modules (including an understanding module A, an understanding module B, and an understanding module C) may obtain vector representations of semantic understandings of all sentences, namely, $\overline{C_A}$, $\overline{C_B}$, and $\overline{C_C}$. In addition, for the currently entered text, using the semantic understanding computing method described above, the understanding modules (including the understanding module A, the understanding module B, and the understanding module C) may obtain vector representations of semantic understandings of the currently entered text, namely, $\overline{h_A}$, $\overline{h_B}$, and $\overline{h_C}$. Therefore, vector representations of semantic understandings that are of the historical dialogues and the currently entered text and that are output by the understanding modules to a generation module are as follows, $M_A=[\overline{C_A}, \overline{h_A}]$, $M_B=[\overline{C_B}, \overline{h_B}]$, and $M_C=[\overline{C_C}, \overline{h_C}]$.

After the understanding module performs computing to obtain at least two semantic understandings of at least two topics, the at least two semantic understandings may be processed using the generation module. In this embodiment of this application, processing manners of the semantic understandings input by the understanding modules may include a fixed linear combination (method 1) and an adaptive linear combination (method 2).

Method 1.

Optionally, when there are at least two target topics, the reply is generated by the target dialogue robot based on a target semantic understanding, and the target semantic understanding is obtained by the target dialogue robot based on the at least one semantic understanding of the text according to the following formula:

$$M = \frac{\sum_{i=1}^{N} P_i C_i}{\sum_{i=1}^{N} P_i}$$

where M represents a vector of the target semantic understanding, $P_i$ represents a correlation probability of the $i^{th}$ target topic, and $C_i$ represents a target semantic understanding that is of the text and that is obtained by performing semantic understanding computing based on the $i^{th}$ target topic, where a value range of i is [1, N], i is a natural number, N represents a quantity of the target topics, and N is a natural number greater than 1.

In an embodiment, the generation module is configured to use a correlation probability of the $i^{th}$ target topic in the at least two target topics as a weight of the $i^{th}$ target topic, and perform weighted summation on the at least two semantic understandings, to obtain the target semantic understanding of the text. The talking module is configured to generate a reply for the text based on the target semantic understanding.

In method 1, a manner of the fixed linear combination is used to determine the target semantic understanding. The fixed linear combination means using a correlation probability of each target topic as a weight to perform computing. For example, when the text is related to a topic A, a topic B, and a topic C, a vector M of a target semantic understanding obtained through linear combination is:

$$M = \frac{P_A C_A + P_B C_B + P_C C_C}{P_A + P_B + P_C}$$

where $P_A$, $P_B$, and $P_C$ respectively represent correlation probabilities of the topic A, the topic B, and the topic C, and $C_A$, $C_B$, and $C_C$ respectively represent vector representations of semantic understandings that are of the historical dialogues and the currently entered text and that are obtained through computing by the understanding module A, the understanding module B, and the understanding module C.

Similar to the processing method in case 1, a semantic understanding of a historical dialogue is combined with a semantic understanding of a current text, to obtain a target semantic understanding of the currently entered text as follows, M=[$\overline{C}$, $\overline{h}$], in other words, column vectors $\overline{C}$ and $\overline{h}$ are connected in series to constitute a longer vector, namely, the target semantic understanding to be input into the talking module. After obtaining the target semantic understanding from the generation module, the talking module may generate lexical items in the reply word by word based on the target semantic understanding.

It may be learned that in the manner of the fixed linear combination, if a correlation probability of a topic is higher, the topic needs a higher weight.

In method 1, in a process of generating a reply word by word by the talking module, the target semantic understanding of the generation module is fixed. In this case, a reply including different topics cannot be adaptively generated.

For example, when a user enters "Peter declares a divorce by microblogging and competes for custody of two children", using method 1, it may not be possible to generate such a reply, "The entertainment industry is so chaotic, and the court should award custody of the children to Peter." The first part of the reply is more concerned with a topic of "entertainment", and the second part of the reply is more concerned with a topic of "law". Therefore, it is necessary to construct a method that can adaptively revise a weight of each topic continuously based on generated content.

Method 2.

In method 2, a manner of the adaptive linear combination is used to compute, based on a generated previous lexical item, a semantic understanding of the previous lexical item, and adaptively generate a next lexical item based on the semantic understanding of the previous lexical item.

Optionally, when there are at least two target topics, the reply includes at least one lexical item, a next lexical item in the reply is generated by the target dialogue robot based on the semantic understanding of a previous lexical item, and the semantic understanding of the previous lexical item is obtained by the target dialogue robot according to the following formula:

$$C_{t+1} = \sum_{i=1}^{N} \omega_i^t C_i$$

where $C_{t+1}$ represents a vector of a semantic understanding of the $t^{th}$ lexical item, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the text and that is obtained by performing semantic understanding computing based on the $i^{th}$ target topic, where a value range of t is [1, S], t is a natural number, S represents a quantity of lexical items included in the reply, S is a natural number greater than 1, a value range of i is [1, N], i is a natural number, N represents a quantity of the target topics, and N is a natural number greater than 1.

In an embodiment, the generation module uses a correlation probability of the $i^{th}$ target topic in the at least two target topics as a weight of the $i^{th}$ target topic, and performs weighted summation on the at least two semantic understandings, to obtain a semantic understanding of the text.

The talking module generates the first lexical item of the reply based on the semantic understanding.

The generation module and the talking module generate a subsequent lexical item of the reply based on the first lexical item of the reply in the following manner.

The generation module determines that relevance between the previous lexical item of the reply and the $i^{th}$ target topic is a weight of the $i^{th}$ target topic, and performs, based on a weight of each target topic, weighted summation on at least two semantic understandings that are of the first sentence and that are generated by a target replying unit, to obtain the semantic understanding of the previous lexical item.

The talking module generates a next lexical item of the reply based on the semantic understanding of the previous lexical item.

Optionally, when there are at least two target topics, the reply includes at least one lexical item, a next lexical item in the reply is generated by the target dialogue robot based on a semantic understanding of a previous lexical item, and the semantic understanding of the previous lexical item is obtained by the target dialogue robot according to the following formula:

$$C_{t+1} = \sum_{i=1}^{N} \left( \frac{P_i}{\sum_{i=1}^{N} P_i} + \omega_i^t \right) C_i$$

where $C_{t+1}$ represents a vector of a semantic understanding of the $t^{th}$ lexical item, $P_i$ represents a correlation probability of the $i^{th}$ target topic, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the text and that is obtained by performing semantic understanding computing based on the $i^{th}$ target topic, where a value range of t is [1, S], t is a natural number, S represents a quantity of lexical items included in the reply, S is a natural number greater than 1, a value range of i is [1, N], i is a natural number, N represents a quantity of the target topics, and N is a natural number greater than 1.

In an embodiment, the generation module uses a correlation probability of the $i^{th}$ target topic in the at least two target topics as a weight of the $i^{th}$ target topic, and performs weighted summation on at least two semantic understandings, to obtain a semantic understanding of the text.

The talking module generates the first lexical item of the reply based on the semantic understanding.

The generation module and the talking module generate a subsequent lexical item of the reply based on the first lexical item of the reply in the following manner.

The generation module determines that a sum of relevance between the previous lexical item of the reply and the $i^{th}$ target topic and the correlation probability of the $i^{th}$ target topic is a weight of the corresponding target topic, and performs, based on a weight of each target topic, weighted summation on at least two semantic understandings that are of the text and that are generated by the target replying unit, to obtain the semantic understanding of the previous lexical item.

The talking module generates a next lexical item of the reply based on the semantic understanding of the previous lexical item.

In method 2, a weight $\omega_1^t$ that is of the $i^{th}$ target topic in the at least two target topics and that is determined based on the relevance between the $t^{th}$ lexical item and the $i^{th}$ target topic may be determined based on generated relevance between $t^{th}$ lexical item and each target topic, for example, may be computed according to the following formula:

$$\omega_i^t = \frac{f(w_t, C_i)}{\sum_{i=1}^{N} f(w_t, C_i)}$$

where f( ) is used to compute the relevance between the $t^{th}$ lexical item and the $i^{th}$ topic, and may be a shallow neural network, $\omega_1^t$ is determined by a currently generated lexical item $w_t$, and a larger weight is allocated to a topic understanding module whose understanding is more important for a currently generated part of the reply.

Using the foregoing method, the talking module may generate a next lexical item based on a vector of a semantic understanding of a previous lexical item, and a reply obtained thereby is more accurate.

Therefore, according to the human-computer dialogue method in this embodiment of this application, the plurality of dialogue robots are preconfigured, topic determining is performed on the text when the text entered by the user is received, and the text is allocated, based on the topic related to the text, to the corresponding dialogue robot for computing to generate the reply for the text. On the basis of understanding of a natural language, processing can be adaptively performed based on the topic related to the text, to generate an accurate reply, thereby improving user experience.

The human-computer dialogue method according to the embodiment of this application is described in detail above with reference to FIG. 3 to FIG. 7. A parameter training method according to an embodiment of this application is described below in detail with reference to FIG. 8.

Figure 8:
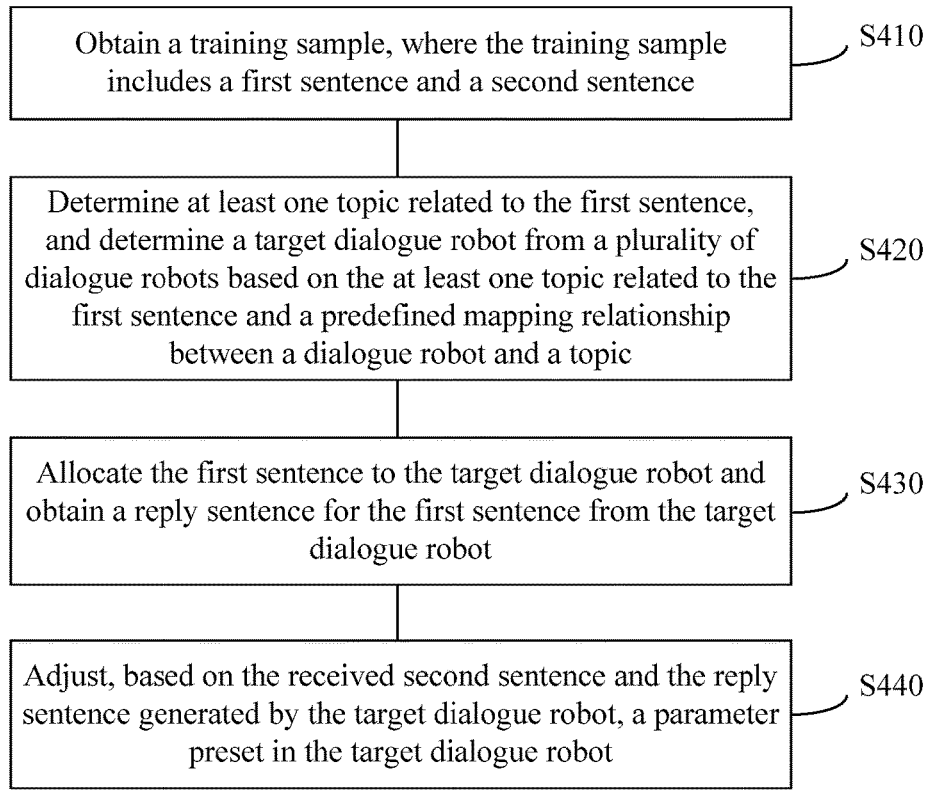
FIG. 8 is a schematic flowchart of a parameter training method according to an embodiment of this application.

FIG. 8 is a schematic flowchart of a parameter training method 400 according to an embodiment of this application. The method 400 may be applied to a human-computer dialogue apparatus. The apparatus is pre-equipped with a plurality of dialogue robots, and each dialogue robot is configured to perform parameter training based on at least one topic. In this embodiment of this application, the method 400 may be performed by the foregoing human-computer dialogue apparatus. The human-computer dialogue apparatus may be understood as an apparatus deployed with a neural network system. A parameter training process is a process in which the neural network system performs training on each computing unit (for example, a topic allocation unit or a dialogue robot). As shown in FIG. 8, the method 400 includes the following steps.

S410. Obtain a training sample, where the training sample includes a first sentence and a second sentence, and the first sentence and the second sentence constitute a dialogue.

S420. Determine at least one topic related to the first sentence, and determine a target dialogue robot from the plurality of dialogue robots based on the at least one topic related to the first sentence and a predefined mapping relationship between a dialogue robot and a topic, where a target topic corresponding to the target dialogue robot is some or all of the at least one topic related to the first sentence.

S430. Allocate the first sentence to the target dialogue robot and obtain a reply sentence for the first sentence from the target dialogue robot, where the reply sentence is a reply generated by the target dialogue robot based on at least one semantic understanding of the first sentence, and the at least one semantic understanding has a one-to-one correspondence with the at least one target topic.

S440. Adjust, based on the received second sentence and the reply sentence generated by the target dialogue robot, a parameter preset in the target dialogue robot.

In an embodiment, the dialogue robot in this embodiment of this application may be understood as a machine learning model (or a neural network model) having a human-machine dialogue function. After being established, the model can run online only after parameter training. Before the parameter training, the mapping relationship between a dialogue robot and a topic may be predefined, and each dialogue robot may perform parameter training on at least one topic. In an embodiment, each dialogue robot may perform semantic understanding computing on an entered sentence in a received training sample based on at least one topic to obtain at least one semantic understanding, and then perform computing based on the at least one semantic understanding to generate a reply for the entered sentence.

For ease of distinguishing and description, it is assumed that a training sample includes a first sentence and a second sentence, the first sentence and the second sentence constitute a dialogue, the first sentence may correspond to a sentence that is entered by a user and that is in the training sample, and the second sentence may correspond to a training reference sentence in the training sample.

In the parameter training process, first, topic determining computing can be performed through allocation based on the entered first sentence (namely, the sentence entered by the user), to determine a related topic and allocate the first sentence to a corresponding dialogue robot. In this embodiment of this application, the training sample includes a plurality of dialogue pairs related to a plurality of topics. Topics described herein may include, for example, entertainment, law, sports, health, travel, science and technology, economics, politics, education, health care, and consumption. The first sentence may be related to at least one of the plurality of topics listed above. In an offline training process, the apparatus may obtain an optimal parameter in advance through parameter training, and can accurately allocate a received sentence to a corresponding dialogue robot.

Then, the dialogue robot performs semantic understanding computing based on the first sentence, to generate a reply sentence for the first sentence. The system compares the generated reply sentence with the entered second sentence (namely, the training reference sentence), to adjust the parameter of the model.

The plurality of topics may correspond to a plurality of dialogue robots, and each dialogue robot corresponds to at least one topic. In other words, one dialogue robot may correspond to one topic, or may correspond to a plurality of topics. A quantity and content of topics corresponding to each dialogue robot may be manually set in advance, and specific content of the topics corresponding to each dialogue robot may be determined based on relevance between the topics. Each dialogue robot may be configured to perform parameter training for the at least one corresponding topic to obtain an optimal parameter, and can accurately reply a user's text.

In this embodiment of this application, to improve efficiency of offline training, one or more processors may be allocated to each dialogue robot to accelerate the training to obtain the optimal parameter.

Optionally, the neural network system may perform parameter training on a plurality of dialogue robots in parallel. Each dialogue robot runs on an independent processor, and the neural network system performs parameter training on each dialogue robot for the corresponding one or more topics, that is, a plurality of processors run in parallel.

Therefore, in this embodiment of this application, the plurality of dialogue robots are preconfigured, topic determining is performed on the received training sample, the training sample is allocated to the corresponding dialogue robot, and then parameter training is performed on the dialogue robot. When a plurality of training samples are received, training samples of different topics may be allocated to different dialogue robots. The training samples are divided into a plurality of training sample sets based on topics, and each dialogue robot performs, for a corresponding topic, parameter training on one of the training sample sets. Therefore, the parameter training can be performed on the plurality of dialogue robots in parallel, an offline training time can be greatly reduced, and offline training efficiency can be improved.

Optionally, the determining at least one topic related to the first sentence includes determining a correlation probability of each of a plurality of predefined topics based on the first sentence entered by the user, where the correlation probability indicates a probability that the first sentence is related to the topic, and determining, based on the correlation probability of each topic and a first preset threshold, the at least one topic related to the first sentence, where a correlation probability of each of the at least one topic is greater than the first preset threshold.

Optionally, when the first sentence is related to at least two topics, the determining a target dialogue robot from the plurality of dialogue robots based on the at least one topic related to the first sentence and a predefined mapping relationship between a dialogue robot and a topic includes determining, based on the at least two topics related to the first sentence and a mapping relationship between the plurality of dialogue robots and a plurality of topics, whether there is a dialogue robot corresponding to the at least two topics, and when it is determined that there is a dialogue robot corresponding to the at least two topics, determining that the dialogue robot corresponding to the at least two topics is the target dialogue robot.

Optionally, the reply sentence is generated by the target dialogue robot based on a target semantic understanding, and the target semantic understanding is obtained by the target dialogue robot based on the at least one semantic understanding of the first sentence according to the following formula:

$$M = \frac{\sum_{i=1}^{N} P_i C_i}{\sum_{i=1}^{N} P_i}$$

where M represents a vector of the target semantic understanding, $P_i$ represents a correlation probability of the $i^{th}$ target topic, and $C_i$ represents a semantic understanding that is of the first sentence and that is obtained by performing semantic understanding computing based on the $i^{th}$ target topic, where a value range of i is [1, N], i is a natural number, N represents a quantity of the target topics, and N is a natural number greater than 1.

Optionally, the reply sentence includes at least one lexical item, a next lexical item in the reply sentence is generated by the target dialogue robot based on a semantic understanding of a previous lexical item, and the semantic understanding of the previous lexical item is obtained by the target dialogue robot according to the following formula:

$$C_{t+1} = \sum_{i=1}^{N} \omega_i^t C_i$$

where $C_{t+1}$ represents a vector of a semantic understanding of the $t^{th}$ lexical item, $\omega_1^t$ represents a weight that is of the $i^{th}$ target topic in N target topics and that is determined based on relevance between the $t^{th}$ lexical item and the $i^{th}$ target topic, and $C_i$ represents a semantic understanding that is of the first sentence and that is obtained by performing semantic understanding computing based on the $i^{th}$ target topic, where a value range of t is [1, S], t is a natural number, S represents a quantity of lexical items included in the reply sentence, S is a natural number greater than 1, a value range of i is [1, N], i is a natural number, N represents a quantity of the target topics, and N is a natural number greater than 1.

Optionally, the reply sentence includes at least one lexical item, a next lexical item in the reply sentence is generated by the target dialogue robot based on a semantic understanding of a previous lexical item, and the semantic understanding of the previous lexical item is obtained by the target dialogue robot according to the following formula:

$$C_{t+1} = \sum_{i=1}^{N}\left(\frac{P_i}{\sum_{i=1}^{N} P_i} + \omega_i^t\right) C_i$$

where $C_{t+1}$ represents a vector of a semantic understanding of the $t^{th}$ lexical item, $P_i$ represents a correlation probability of the $i^{th}$ target topic, $\omega_1^t$ a weight that is of the $i^{th}$ target topic in N target topics and that is determined based on relevance between the $t^{th}$ lexical item and the $i^{th}$ target topic, and $C_i$ represents a semantic understanding that is of the first sentence and that is obtained by performing semantic understanding computing based on the $i^{th}$ target topic, where a value range of t is [1, S], t is a natural number, S represents a quantity of lexical items included in the reply sentence, S is a natural number greater than 1, a value range of i is [1, N], i is a natural number, N represents a quantity of the target topics, and N is a natural number greater than 1.

Optionally, when the first sentence is related to at least two topics, the determining a target dialogue robot from the plurality of dialogue robots based on the at least one topic related to the first sentence and a predefined mapping relationship between a dialogue robot and a topic includes determining, based on the at least two topics related to the first sentence and a mapping relationship between the plurality of dialogue robots and a plurality of topics, whether there is a dialogue robot corresponding to the at least two topics, and when it is determined that there is no dialogue robot corresponding to the at least two topics, determining that a dialogue robot that corresponds to a topic having a highest correlation probability in the plurality of topics is the target dialogue robot.

Optionally, the determining, based on the correlation probability of each topic and a first preset threshold, the at least one topic related to the first sentence includes determining whether a largest value of correlation probabilities of the plurality of topics is less than a second preset threshold, and when the largest value of the correlation probabilities of the plurality of topics is less than the second preset threshold, determining, based on the correlation probability of each topic and the first preset threshold, the at least one topic related to the first sentence.

Optionally, the determining at least one topic related to the first sentence, and determining a target dialogue robot from the plurality of dialogue robots based on the at least one topic related to the first sentence and a predefined mapping relationship between a dialogue robot and a topic includes determining a correlation probability of each of a plurality of predefined topics based on the first sentence entered by the user, where the correlation probability indicates a probability that the first sentence is related to the topic, determining whether a largest value of correlation probabilities of the plurality of topics is less than a second preset threshold, when it is determined that the largest value of the correlation probabilities of the plurality of topics is greater than or equal to the second preset threshold, determining that a topic corresponding to the largest value of the correlation probabilities of the plurality of topics is the target topic, and determining, based on the predefined mapping relationship between a dialogue robot and a topic, that a dialogue robot corresponding to the target topic is the target dialogue robot.

Optionally, when the target dialogue robot corresponds to one target topic, the reply sentence is generated by the target dialogue robot based on the semantic understanding of the first sentence.

It should be understood that, a specific process in which after receiving the first sentence, the human-computer dialogue apparatus determines the target dialogue robot based on the topic related to the first sentence and the predefined mapping relationship between a dialogue robot and a topic, and the target dialogue robot generates the reply sentence based on the first sentence is similar to the process described above with reference to FIG. 3 to FIG. 7. For brevity, details are not described herein again.

It should be further understood that the method for training a model parameter may be based on a training sample similar to a parameter training method. For brevity, detailed descriptions of a specific process thereof are omitted herein.

Figure 9:
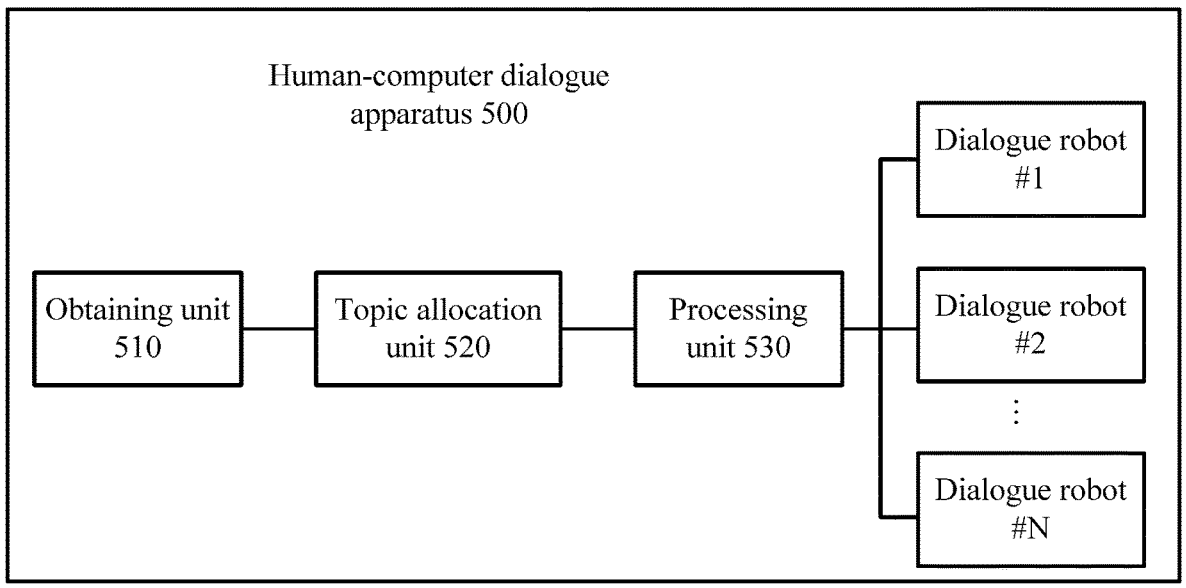
FIG. 9 is a schematic block diagram of a human-computer dialogue apparatus according to an embodiment of this application.

FIG. 9 is a schematic block diagram of a human-computer dialogue apparatus 500 according to an embodiment of this application. As shown in FIG. 9, the apparatus 500 includes an obtaining unit 510, a topic allocation unit 520, and a processing unit 530.

The processing unit 530 may be communicatively connected to a plurality of dialogue robots (for example, a dialogue robot #1, a dialogue robot #2, . . . , and a dialogue robot #N) preconfigured in the apparatus 500, to allocate a received sentence entered by a user to a dialogue robot corresponding to a topic, for processing, and obtain a reply sentence from the corresponding dialogue robot.

It should be understood that the apparatus 500 may correspond to (for example, may be equipped with or may be) the human-computer dialogue apparatus described in the foregoing method 300. In addition, modules or units in the apparatus 500 are respectively configured to perform actions or processing processes performed by the human-computer dialogue apparatus described in the foregoing method 300. To avoid repetition, detailed descriptions thereof are omitted herein.

Figure 10:
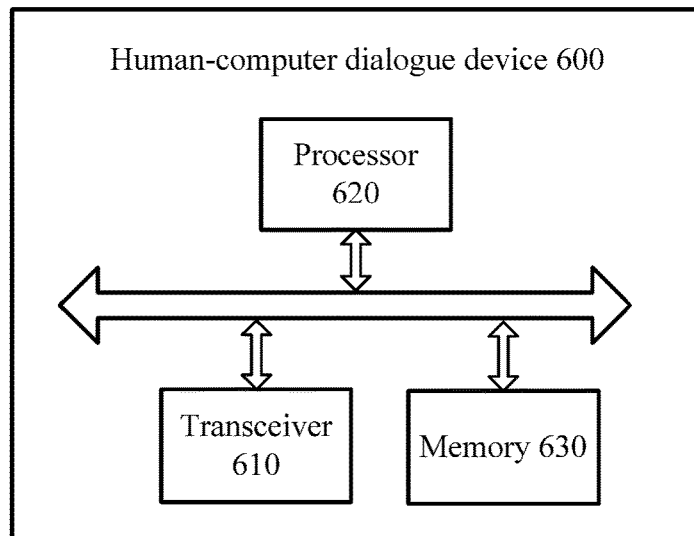
FIG. 10 is a schematic block diagram of a human-computer dialogue device according to an embodiment of this application.

FIG. 10 is a schematic block diagram of a human-computer dialogue device 600 according to an embodiment of this application. As shown in FIG. 10, the device 600 includes a transceiver 610, a processor 620, and a memory 630. The transceiver 610, the processor 620, and the memory 630 communicate with each other along an internal connection path to transfer control and/or data signals.

In an embodiment, the device 600 may correspond to (for example, may be equipped with or may be) the human-computer dialogue apparatus described in the foregoing method 300. In the device 600, the processor 620 is configured to perform the method in the embodiment shown in FIG. 3 and implement the functions of the device 600 in the embodiment shown in FIG. 3. In addition, the processor 620 is further configured to perform actions and processing processes, shown in FIG. 4 to FIG. 7, in which the dialogue robot performs semantic understanding computing on the entered text and generates the reply sentence, and implement the functions of the dialogue robot shown in FIG. 4 to FIG. 7.

It should be understood that in this embodiment of this application, in addition to the processor configured to perform the method shown in FIG. 3, the device 600 may further include one or more processors (for example, a GPU), configured to perform the steps shown in FIG. 4 to FIG. 7 by the dialogue robot.

It should be noted that the human-computer dialogue device 600 is a device deployed in a cloud server. The transceiver 610, the processor 620, and the memory 630 included in the device 600 may be understood as resources allocated by the cloud server to the device 600. The processor 620 may be one or more processors. This is not particularly limited in this application.

Therefore, in this embodiment of this application, a plurality of dialogue robots are preconfigured, topic determining is performed on the text when the text entered by a user is received, and the text is allocated, based on a topic related to the text, to a corresponding dialogue robot for computing to generate a reply for the text. On the basis of understanding of a natural language, processing can be adaptively performed based on the topic related to the text, to generate an accurate reply, thereby improving user experience.

Figure 11:
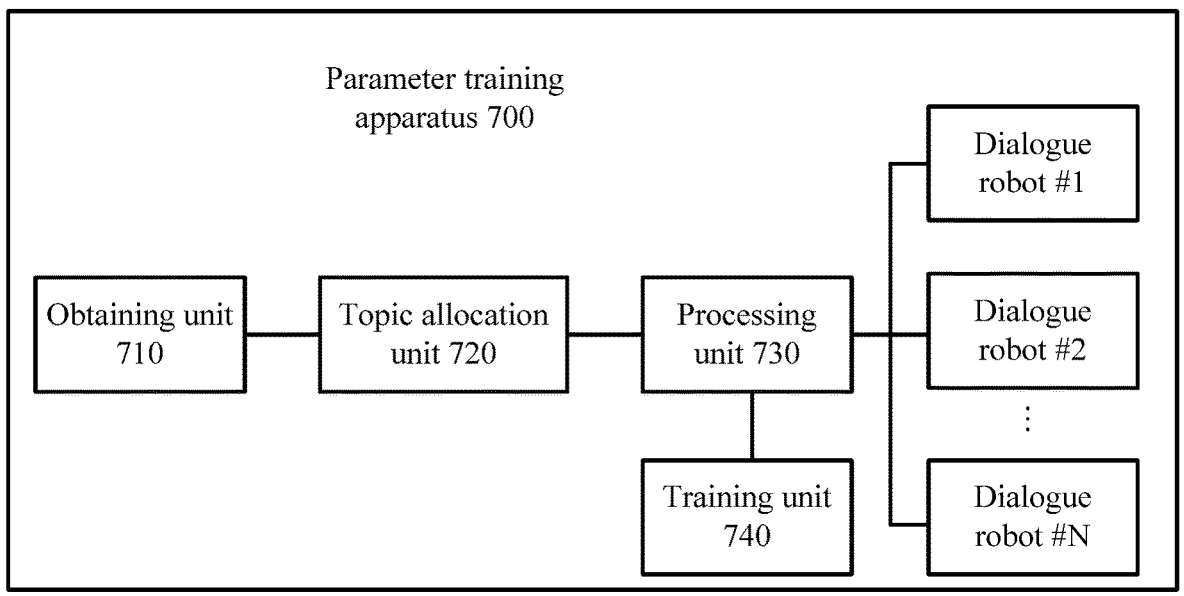
FIG. 11 is a schematic block diagram of a parameter training apparatus according to an embodiment of this application.

FIG. 11 is a schematic block diagram of a parameter training apparatus 700 according to an embodiment of this application. As shown in FIG. 11, the apparatus 700 includes an obtaining unit 710, a topic allocation unit 720, a processing unit 730, and a training unit 740.

The processing unit 730 may be communicatively connected to a plurality of dialogue robots (for example, a dialogue robot #1, a dialogue robot #2, . . . , and a dialogue robot #N) preconfigured in the apparatus 700, to allocate a received sentence entered by a user to a dialogue robot corresponding to a topic, for processing, obtain a reply sentence from the corresponding dialogue robot, and send the reply sentence to the training unit 740. The training unit 740 performs parameter training.

It should be understood that the apparatus 700 may correspond to (for example, may be equipped with or may be) the human-computer dialogue apparatus described in the foregoing method 400. In addition, modules or units in the apparatus 700 are respectively configured to perform actions or processing processes performed by the parameter training apparatus described in the foregoing method 400. To avoid repetition, detailed descriptions thereof are omitted herein.

Figure 12:
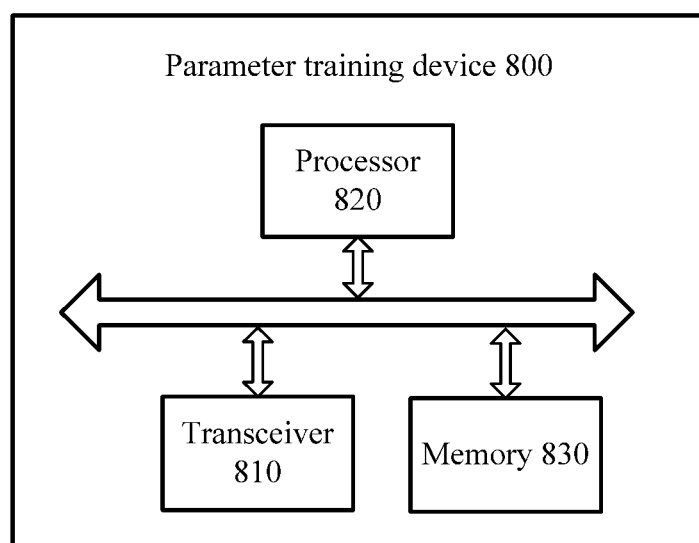
FIG. 12 is a schematic block diagram of a parameter training device according to an embodiment of this application.

FIG. 12 is a schematic block diagram of a parameter training device 800 according to an embodiment of this application. As shown in FIG. 12, the device 800 includes a transceiver 810, a processor 820, and a memory 830. The transceiver 810, the processor 820, and the memory 830 communicate with each other along an internal connection path to transfer control and/or data signals.

In an embodiment, the device 800 may correspond to (for example, may be equipped with or may be) the parameter training apparatus described in the foregoing method 400. In the device 800, the processor 820 is configured to perform the method in the embodiment shown in FIG. 8 and implement the functions of the device 800 in the embodiment shown in FIG. 8. In addition, the processor 820 is further configured to perform actions or processing processes, shown in FIG. 4 to FIG. 7, in which the dialogue robot performs semantic understanding computing on the entered text and generates the reply sentence, and implement the functions of the dialogue robot shown in FIG. 4 to FIG. 7.

It should be understood that in this embodiment of this application, in addition to the processor configured to perform the method shown in FIG. 3, the device 800 may further include one or more processors (for example, a GPU), configured to perform the steps shown in FIG. 4 to FIG. 7 by the dialogue robot.

It should be noted that the parameter training device 800 is a device deployed in a cloud server. The transceiver 810, the processor 820, and the memory 830 included in the device 800 may be understood as resources allocated by the cloud server to the device 800. The processor 820 may be one or more processors. This is not particularly limited in this application.

Therefore, in this embodiment of this application, topic determining is first performed on a received training sample, the training sample is allocated to a corresponding dialogue robot, and then parameter training is performed on the dialogue robot. When a plurality of training samples are received, training samples of different topics may be allocated to different dialogue robots. The training samples are divided into a plurality of training sample sets based on topics, and each dialogue robot performs, for a corresponding topic, parameter training on one of the training sample sets. Therefore, the parameter training can be performed on the plurality of dialogue robots in parallel, an offline training time can be greatly reduced, and offline training efficiency can be improved.

It should be understood that the embodiments of this application may be applied to a processor, or implemented by a processor. The processor may be an integrated circuit chip and has a signal processing capability. In an implementation process, steps in the foregoing method embodiments can be implemented using a hardware integrated logic circuit in the processor, or using instructions in a form of software. The foregoing processor may be a CPU, or the processor may be another general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished using a hardware decoding processor, or may be performed and accomplished using a combination of hardware and software in the decoding processor. The software may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of illustrative rather than limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory DR RAM). It should be noted that the memory of the systems and methods described in this specification includes but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In an implementation process, steps in the foregoing methods can be implemented using a hardware integrated logic circuit in the processor, or using instructions in a form of software. The steps of the human-computer dialogue method disclosed with reference to the embodiments of this application may be directly performed by a hardware processor, or may be performed using a combination of hardware and software in the processor. The software may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A human-computer dialogue method performed by a human-computer dialogue apparatus pre-equipped with a plurality of dialogue robots, wherein each dialogue robot is configured to conduct a human-computer dialogue based on at least one topic, and wherein the method comprises:
   obtaining a text entered by a user;
   determining at least one topic related to the text;
   determining a target dialogue robot from the plurality of dialogue robots based on the at least one topic related to the text and a predefined mapping relationship between a dialogue robot of the plurality of dialogue robots and a topic, wherein a target topic corresponding to the target dialogue robot is included in the at least one topic related to the text; and
   generating, by the target dialogue robot, a reply for the text based on a semantic understanding of the text, wherein the semantic understanding has a one-to-one correspondence with the target topic;
   wherein before determining the at least one topic related to the text, the method further comprises performing parameter training on the plurality of dialogue robots in parallel based on the predefined mapping relationship between the dialogue robot of the plurality of dialogue robots and the topic, wherein each dialogue robot is configured to perform the parameter training for at least one corresponding topic.

2. The human-computer dialogue method of claim 1, wherein determining the at least one topic related to the text comprises determining a correlation probability of each of a plurality of predefined topics based on the text entered by the user, wherein the correlation probability indicates a probability that the text is related to the predefined topic.

3. The human-computer dialogue method of claim 1, wherein determining the at least one topic related to the text comprises:
   determining a correlation probability of each of a plurality of predefined topics based on the text entered by the user, wherein the correlation probability indicates a probability that the text is related to the predefined topic; and determining, based on the correlation probability of each of the plurality of predefined topics and a first preset threshold, the at least one topic related to the text, wherein a correlation probability of each of the at least one topic is greater than the first preset threshold.

4. The human-computer dialogue method of claim 3, wherein determining, based on the correlation probability of each of the plurality of predefined topics and the first preset threshold, the at least one topic related to the text comprises:
   determining whether a largest value of correlation probabilities of the plurality of predefined topics is less than a second preset threshold; and
   determining, based on the correlation probability of each of the plurality of predefined topics and the first preset threshold, the at least one topic related to the text in response to the largest value of the correlation probabilities being less than the second preset threshold.

5. The human-computer dialogue method of claim 1, wherein the text is related to at least two topics, wherein determining the target dialogue robot from the plurality of dialogue robots based on the at least one topic related to the text and the predefined mapping relationship between the dialogue robot of the plurality of dialogue robots and the topic comprises:
   determining, based on the at least two topics related to the text and the predefined mapping relationship between the dialogue robot of the plurality of dialogue robots and the topic, whether a dialogue robot corresponding to the at least two topics exists in the plurality of dialogue robots; and
   determining that the dialogue robot corresponding to the at least two topics is the target dialogue robot in response to the dialogue robot corresponding to the at least two topics existing in the plurality of dialogue robots, wherein the target topic comprises the at least two topics.

6. The human-computer dialogue method of claim 5, wherein the reply is generated by the target dialogue robot based on a target semantic understanding, and wherein the method further comprises obtaining, by the target dialogue robot, the target semantic understanding based on the semantic understanding of the text according to the following formula:

$$M = \frac{\sum_{i=1}^{N} P_i C_i}{\sum_{i=1}^{N} P_i}$$

wherein M represents a vector of the target semantic understanding, $P_i$ represents a correlation probability of an $i^{th}$ target topic in N target topics, and $C_i$ represents a semantic understanding that is of the text and computed based on the $i^{th}$ target topic, and wherein a value range of i is [1, N], i is a natural number, N represents a quantity of the target topics, and N is a natural number greater than 1.

7. The human-computer dialogue method of claim 5, wherein the reply comprises at least two lexical items, wherein a next lexical item in the reply is based on a semantic understanding of a previous lexical item, and wherein the method further comprises obtaining the semantic understanding of the previous lexical item according to the following formula:

$$C_{t+1} = \sum_{i=1}^{N} \omega_i^t C_i$$

wherein $C_{t+1}$ represents a vector of a semantic understanding of a $t^{th}$ lexical item, $\omega_1^t$ represents a weight that is of an $i^{th}$ target topic in N target topics and is based on relevance between the $t^{th}$ lexical item and the $i^{th}$ target topic, and $C_i$ represents a semantic understanding that is of the text and computed based on the $i^{th}$ target topic, and wherein a value range of t is [1, S], t is a natural number, S represents a quantity of lexical items comprised in the reply, S is a natural number greater than 1, a value range of i is [1, N], i is a natural number, N represents a quantity of the target topics, and N is a natural number greater than 1.

8. The human-computer dialogue method of claim 1, wherein the text is related to at least two topics, and wherein determining the target dialogue robot from the plurality of dialogue robots based on the at least one topic related to the text and the predefined mapping relationship between the dialogue robot of the plurality of dialogue robots and the topic comprises:
   determining, based on the at least two topics related to the text and the predefined mapping relationship between the dialogue robot of the plurality of dialogue robots and the topic, whether a dialogue robot corresponding to the at least two topics exists in the plurality of dialogue robots; and
   determining that a dialogue robot corresponding to a topic having a highest correlation probability of a plurality of predefined topics is the target dialogue robot in response to the dialogue robot corresponding to the at least two topics not existing in the plurality of dialogue robots.

9. The human-computer dialogue method of claim 8, wherein the target dialogue robot corresponds to only one target topic.

10. The human-computer dialogue method of claim 1, wherein determining the at least one topic related to the text and the target dialogue robot from the plurality of dialogue robots based on the at least one topic related to the text and the predefined mapping relationship between the dialogue robot of the plurality of dialogue robots and the topic comprises:
    determining a correlation probability of each of a plurality of predefined topics based on the text entered by the user, wherein the correlation probability indicates a probability that the text is related to the predefined topic;
    determining whether a largest value of correlation probabilities of the plurality of predefined topics is less than a second preset threshold;
    determining that a topic corresponding to the largest value of the correlation probabilities of the plurality of predefined topics is the target topic in response to the largest value of the correlation probabilities of the plurality of predefined topics being greater than or equal to the second preset threshold; and
    determining, based on the predefined mapping relationship between the dialogue robot of the plurality of dialogue robots and the topic, that a dialogue robot corresponding to the target topic is the target dialogue robot.

11. A human-computer dialogue apparatus pre-equipped with a plurality of dialogue robots, wherein each dialogue robot is configured to conduct a human-computer dialogue based on at least one topic, and wherein the human-computer dialogue apparatus comprises:

a memory configured to store instructions; and a processor coupled to the memory and configured to execute the instructions, wherein the instructions, when executed, cause the processor to:

obtain a text entered by a user;

determine at least one topic related to the text;

determine a target dialogue robot from the plurality of dialogue robots based on the at least one topic related to the text and a predefined mapping relationship between a dialogue robot of the plurality of dialogue robots and a topic, wherein a target topic corresponding to the target dialogue robot is included in the at least one topic related to the text; and generate a reply for the text based on a semantic understanding of the text, wherein the semantic understanding has a one-to-one correspondence with the target topic; and perform parameter training on the plurality of dialogue robots in parallel, wherein each dialogue robot is configured to perform the parameter training for at least one corresponding topic.

12. The human-computer dialogue apparatus of claim 11, wherein the instructions, when executed, further cause the processor to determine a correlation probability of each of a plurality of predefined topics based on the text entered by the user, wherein the correlation probability indicates a probability that the text is related to the predefined topic.

13. The human-computer dialogue apparatus of claim 11, wherein the instructions, when executed, further cause the processor to:

determine a correlation probability of each of a plurality of predefined topics based on the text entered by the user, wherein the correlation probability indicates a probability that the text is related to the predefined topic; and determine, based on the correlation probability of each of the plurality of predefined topics and a first preset threshold, the at least one topic related to the text, wherein a correlation probability of each of the at least one topic is greater than the first preset threshold.

14. The human-computer dialogue apparatus of claim 13, wherein the instructions, when executed, further cause the processor to:

determine whether a largest value of correlation probabilities of the plurality of predefined topics is less than a second preset threshold; and determine, based on the correlation probability of each of the plurality of predefined topics and the first preset threshold, the at least one topic related to the text in response to the largest value of the correlation probabilities being less than the second preset threshold.

15. The human-computer dialogue apparatus of claim 11, wherein the text is related to at least two topics, and wherein the instructions, when executed, further cause the processor to:

determine, based on the at least two topics related to the text and the predefined mapping relationship between the dialogue robot of the plurality of dialogue robots and the topic, whether a dialogue robot corresponding to the at least two topics exists in the plurality of dialogue robots; and determine that the dialogue robot corresponding to the at least two topics is the target dialogue robot in response to the dialogue robot corresponding to the at least two topics existing in the plurality of dialogue robots, wherein the target topic comprises the at least two topics.

16. The human-computer dialogue apparatus of claim 15, wherein the reply is generated by the target dialogue robot based on a target semantic understanding, and wherein the instructions, when executed, further cause the processor to obtain the target semantic understanding based on the semantic understanding of the text according to the following formula:

$$M = \frac{\sum_{i=1}^{N} P_i C_i}{\sum_{i=1}^{N} P_i}$$

wherein M represents a vector of the target semantic understanding, $P_i$ represents a correlation probability of an $i^{th}$ target topic in N target topics, and $C_i$ represents a semantic understanding that is of the text and computed based on the $i^{th}$ target topic, and wherein a value range of i is [1, N], i is a natural number, N represents a quantity of the target topics, and N is a natural number greater than 1.

17. The human-computer dialogue apparatus of claim 15, wherein the reply comprises at least two lexical items, wherein a next lexical item in the reply is based on a semantic understanding of a previous lexical item, and wherein the instructions, when executed, further cause the processor to obtain the semantic understanding of the previous lexical item according to the following formula:

$$C_{t+1} = \sum_{i=1}^{N} \omega_i^t C_i$$

wherein $C_{t+1}$ represents a vector of a semantic understanding of a $t^{th}$ lexical item, $\omega_1^t$ represents a weight that is of an $i^{th}$ target topic in N target topics and is based on relevance between the $t^{th}$ lexical item and the $i^{th}$ target topic, and $C_i$ represents a semantic understanding that is of the text and computed based on the $i^{th}$ target topic, and wherein a value range of t is [1, S], t is a natural number, S represents a quantity of lexical items comprised in the reply, S is a natural number greater than 1, a value range of i is [1, N], i is a natural number, N represents a quantity of the target topics, and N is a natural number greater than 1.

18. The human-computer dialogue apparatus of claim 11, wherein the text is related to at least two topics, and wherein the instructions, when executed, further cause the processor to:

determine, based on the at least two topics related to the text and the predefined mapping relationship between the dialogue robot of the plurality of dialogue robots and the topic, whether a dialogue robot corresponding to the at least two topics exists in the plurality of dialogue robots; and determine that a dialogue robot corresponding to a topic having a highest correlation probability of a plurality of predefined topics is the target dialogue robot in response to the dialogue robot corresponding to the at least two topics not existing in the plurality of dialogue robots.

19. The human-computer dialogue apparatus of claim 18, wherein the target dialogue robot corresponds to only one target topic.

20. The human-computer dialogue apparatus of claim 11, wherein the instructions, when executed, further cause the processor to:
- determine a correlation probability of each of a plurality of predefined topics based on the text entered by the user, wherein the correlation probability indicates a probability that the text is related to the predefined topic;
- determine whether a largest value of correlation probabilities of the plurality of predefined topics is less than a second preset threshold;
- determine that a topic corresponding to the largest value of the correlation probabilities of the plurality of predefined topics is the target topic in response to the largest value of the correlation probabilities of the plurality of predefined topics being greater than or equal to the second preset threshold; and
- determine, based on the predefined mapping relationship between the dialogue robot of the plurality of dialogue robots and the topic, that a dialogue robot corresponding to the target topic is the target dialogue robot.

* * * * *